(12) United States Patent
Shimizu et al.

(10) Patent No.: US 8,107,033 B2
(45) Date of Patent: Jan. 31, 2012

(54) BACKLIGHT DEVICE AND LIQUID CRYSTAL DISPLAYING DEVICE

(75) Inventors: Masaki Shimizu, Osaka (JP); Mitsuhiro Moriyasu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 325 days.

(21) Appl. No.: 12/514,512

(22) PCT Filed: Nov. 5, 2007

(86) PCT No.: PCT/JP2007/071489
§ 371 (c)(1),
(2), (4) Date: May 12, 2009

(87) PCT Pub. No.: WO2008/059725
PCT Pub. Date: May 22, 2008

(65) Prior Publication Data
US 2010/0053492 A1    Mar. 4, 2010

(30) Foreign Application Priority Data

Nov. 13, 2006 (JP) ................................ 2006-306295
Oct. 31, 2007 (JP) ................................ 2007-283164

(51) Int. Cl.
*G02F 1/1333* (2006.01)
*G02F 1/1335* (2006.01)

(52) U.S. Cl. .......................................... 349/58; 349/70

(58) Field of Classification Search .................. 349/70, 349/58
See application file for complete search history.

(56) References Cited

U.S. PATENT DOCUMENTS

| | | | | |
|---|---|---|---|---|
| 5,975,722 | A * | 11/1999 | Van Duijneveldt | 362/97.1 |
| 7,042,157 | B2 * | 5/2006 | Chou | 313/624 |
| 7,527,406 | B2 * | 5/2009 | Kwon et al. | 362/561 |
| 7,863,835 | B2 * | 1/2011 | Lin et al. | 315/312 |
| 2003/0086255 | A1 * | 5/2003 | Moon et al. | 362/97 |
| 2005/0226002 | A1 | 10/2005 | Aoki et al. | |
| 2006/0126321 | A1 * | 6/2006 | Lim | 362/29 |
| 2006/0279957 | A1 | 12/2006 | Kwon et al. | |

FOREIGN PATENT DOCUMENTS

| | | |
|---|---|---|
| CN | 1684318 A | 10/2005 |
| CN | 1811565 A | 8/2006 |
| JP | 1-276503 A | 11/1989 |
| JP | 6-18876 A | 1/1994 |
| JP | 2000-501229 A | 2/2000 |
| JP | 2002-100205 A | 4/2002 |

(Continued)

*Primary Examiner* — Rhonda Peace
(74) *Attorney, Agent, or Firm* — Birch, Stewart, Kolasch & Birch, LLP

(57) ABSTRACT

A frame is narrowed by a technically reasonable design, without technical limitation for frame narrowing which tends to be considered troublesome when bent-tube type fluorescent tubes having U-shaped bent portions are to be alternately arranged to face each other nor without the trouble of storing the bent-type fluorescent tubes in a chassis while being manufactured. A backlight device (2) is provided with a backlight chassis (23) wherein a plurality of fluorescent tubes (21) having electrodes are arranged and stored, and an inverter circuit board is arranged on the rear surface of the backlight chassis (23). Furthermore, the backlight device (2) is provided with a storing section (30), which is attached to the backlight chassis (23) by storing a conductive holding section for holding the electrodes. With the storing section (30) attached to the backlight chassis (23), the electrodes of the fluorescent tubes (21) are electrically connected to a light source lighting circuit board arranged on the rear surface of the backlight chassis (23).

10 Claims, 20 Drawing Sheets

FOREIGN PATENT DOCUMENTS

| | | |
|---|---|---|
| JP | 2002-278471 | 9/2002 |
| JP | 2004-294592 A | 10/2004 |
| JP | 2006-286448 A | 10/2006 |
| JP | 2006-344602 A | 12/2006 |
| WO | WO-98/12470 A1 | 3/1998 |

* cited by examiner

US 8,107,033 B2

BACKLIGHT DEVICE AND LIQUID CRYSTAL DISPLAYING DEVICE

TECHNICAL FIELD

The present invention relates to a backlight device and a liquid crystal displaying device, more specifically, to a backlight device that is used as a light source for illumination, such as a liquid crystal television and a liquid crystal displaying device including the backlight device.

BACKGROUND OF THE INVENTION

With enlargement of a screen of a liquid crystal television or the like in recent years, enlargement of a backlight included in the liquid crystal television is also required. In order to cope with such a requirement for enlargement of the backlight, and further with a requirement for energy saving, price reduction and the like, a backlight including a bent-tube type fluorescent tube instead of a conventional straight-tube type fluorescent tube has been developed. Such a bent-tube type fluorescent tube is obtained by bending a substantially center part of a long straight-tube type fluorescent tube and molding the bent portion in a U-shape or in a channel-shape (squared U-shape).

In the case of the backlight using the bent-tube type fluorescent tube, temperature distribution is relatively uniform, for example, in a screen size of around less than 17 inches, and temperature difference or luminance difference in a tube axis direction of the fluorescent tube has hardly caused a problem.

However, with more enlargement of a screen of a liquid crystal television, a voltage applied to a fluorescent tube is increased by an increase in a length of the fluorescent tube, in addition to the temperature rise in an electrode portion of the fluorescent tube as a main heat generating source. In addition, due to stray capacitance between the fluorescent tube and a unit accompanied with that, leak currents are likely to be generated near a high-voltage portion. Moreover, as inverter electric power is increased accompanied with an increase in electric power of the fluorescent tube, a heat generation volume in an inverter that is arranged on the rear face of the electrode portion of the fluorescent tube is increased. As a result, the temperature difference in the tube axis direction of the fluorescent tube becomes large.

Further, due to the above-described generation of the leak currents, the fluorescent tube is lit with a total current value of rated currents and leak currents near the high-voltage portion of the fluorescent tube, which causes luminance difference generated in the tube axis direction of the fluorescent tube. In this way, with enlargement of the backlight, the temperature difference and the luminance difference in the tube axis direction of the fluorescent tube are likely to be increased, which has caused generation of luminance unevenness of the backlight.

Moreover, for example, a step of coating a phosphor of the fluorescent tube includes processing of sucking up a suspension containing the phosphor from either one of ends of a glass tube constituting the fluorescent tube. At this time, as a length of the glass tube is made longer, it becomes difficult to obtain uniform distribution of three colors of phosphors.

When the distribution of three colors of phosphors becomes uneven in the tube axis direction of the glass tube, difference is generated in the capability that the phosphors convert ultraviolet rays into visible light or rates that the phosphors absorb the visible light, thus generating color unevenness and luminance unevenness in the tube axis direction of the glass tube. Such a tendency becomes remarkable as the length in the tube axis direction of the fluorescent tube becomes longer.

As to a technology of uniforming such luminance unevenness and color unevenness of the backlight, for example, the Patent document 1 discloses an illuminating device of a transmission-type image displaying device, including a linear light source, a reflection member that surrounds a part of the light source and reflects apart of light from the light source, and a diffusion plate that irradiates direct incident light from the light source and reflected light from the reflection member, in which the light source has two or more straight-tube portions, each of which has a different length in a tube axis direction, and a plurality of light sources are alternately arranged to face each other.

Moreover, in the Patent document 2, when two cathode tubes that are bent into a U-shape to the reflecting surface side of a reflection case are arranged, the two cathode tubes are arranged in a state where, between two straight-tube portions of one cathode tube, one straight-tube portion of the other cathode tube is inserted.

Accordingly, each of the straight-tube portions of the different cathode tubes are alternately adjacent to each other, thus light from each of the cathode tubes and light reflected from the reflecting surface of the reflection case are mixed in the almost whole areas of a plurality of cathode tubes, resulting that it is possible to suppress variance in chromaticity even when cathode tubes having different chromaticity to a certain extent are used.

[Patent document 1] Japanese Laid-Open Patent Publication No. 1-276503
[Patent document 2] Japanese Laid-Open Patent Publication No. 2002-100205

DISCLOSURE OF THE INVENTION

Problems to be Solved by the Invention

When a backlight is constituted using the bent-tube type fluorescent tube as described above, a size of a liquid crystal panel illuminated by the backlight is limited. That is, when the bent-tube type fluorescent tube is used, a screen size of the liquid crystal panel is limited to a screen size in which one side has a length half the total length of the fluorescent tube at the maximum. In fact, a backlight chassis that stores the fluorescent tube is provided with a frame for masking apart where luminance unevenness is generated around a light emitting area of the fluorescent tube so that an effective light emitting area of illumination light is narrower than the light emitting area of the fluorescent tube.

Thus, the screen size of the liquid crystal panel is limited to a length that is further shorter than the length half the total length of the bent-tube type fluorescent tube. In the structure using the bent-tube type fluorescent tube as described above, particularly, as a U-shaped or channel-shaped bent portion is larger, luminance unevenness in that area becomes remarkable, thus posing a problem that it is necessary to enlarge an area of the frame so as to narrow the effective light emitting area. In particular, in the case of the U-shaped fluorescent tube as shown in FIG. 1 of the Patent document 2, the frame area masking the bent portion becomes large.

Moreover, as described above, luminance unevenness and color unevenness are generated in the tube axis direction of one fluorescent tube, which is likely to be remarkable as the length of the fluorescent tube becomes longer. Thus, when the glass tube is bent so that straight tube portions have different lengths at a step of bending the glass tube for manufacturing the bent-tube type fluorescent tube, color unevenness and luminance unevenness are generated uniformly corresponding to the lengths of the straight tube portions. That is, similar color unevenness and luminance unevenness are generated in the straight-tube portions having the same length.

When these two bent-tube type fluorescent-tubes are alternately arranged so that straight-tube portions thereof face each other, straight tube portions that emit the nearly same color of light or straight-tube portions that have the same luminance level are arranged so as to be adjacent to each other, thus posing a problem that color unevenness and luminance unevenness can not be solved completely.

Further, at a step of assembling a backlight in which bent-tube type fluorescent tubes as described above are alternately arranged to face each other, for example, when a worker takes out fluorescent tubes stored by packaging material to store in a backlight chassis, the worker needs to work while holding the fluorescent tubes in turn so that the fluorescent tubes face opposite directions. At this time, as the length of straight-tube portions of the fluorescent tubes is longer, the work of holding in turn is the troublesome and an attachment mistake easily occurs, resulting in degradation in production efficiency.

Further, when the fluorescent tube is stored in the backlight chassis, an electrode portion of the fluorescent tube attached to the backlight chassis is typically required to be connected to an inverter transformer of an inverter circuit board provided on the rear face of the backlight chassis. In this case, wiring work for connecting the electrode portion of the fluorescent tube to the inverter transformer is also complicated, and when designing arrangement of fluorescent tubes, it is necessary to secure safety in the high-voltage wiring processing even with the structure for solving luminance unevenness and color unevenness.

The present invention has been made in view of the above-described circumstances, and aims to provide a backlight device and a liquid crystal displaying device, in which frame narrowing is realized by a technically reasonable design, without technical limitation for frame narrowing which tends to be considered troublesome when bent-tube type fluorescent tubes having U-shaped or channel-shaped bent portions are alternately arranged to face each other nor without the trouble accompanied with the work of storing the bent-tube type fluorescent tubes in a chassis, which becomes a problem in manufacturing.

Means for Solving the Problems

In order to solve the above problem, a first technical means is a backlight device, comprising: a chassis that stores, in a row, a plurality of light sources constituted by a straight-tube type fluorescent tube having electrodes at both ends; a light source lighting circuit board that is included on a rear face of the chassis; and a storing portion that stores a conductive holding portion for holding the electrodes and is attached to the chassis; wherein the storing portion is attached to the chassis so that the electrodes form a state of being electrically connected to the light source lighting circuit board included on the rear face of the chassis, and the light source lighting circuit board comprises conduction structure of connecting electrodes in one side of two light sources of the light sources that are arranged in a row.

A second technical means is the backlight device as defined in the first technical means, wherein a part of the storing portion passes through a through-hole provided on the chassis and forms a connection state with a connecting portion included in the light source lighting circuit board so that the light sources form a state of being electrically connected to the light source lighting circuit board.

A third technical means is the backlight device as defined in the first technical means, wherein a part of the storing portion is connected to the connecting portion mounted on the light source lighting circuit board so that the light sources form a state of being electrically connected to the light source lighting circuit board.

A fourth technical means is the backlight device as defined in the first technical means, wherein the light source lighting circuit boards are provided as a pair to be connected to both ends of the light sources that are arranged in a row.

A fifth technical means is the backlight device as defined in the first technical means, wherein the conduction structure is included on a face opposite to a face where a wiring pattern for supplying electric power to the light sources from the light source lighting circuit board is included.

A sixth technical means is the backlight device as defined in the first technical means, wherein the conduction structure is formed in a state of passing through a lower face of electric power supplying structure that supplies electric power to the light sources.

A seventh technical means is the backlight device as defined in the first technical means, wherein the conduction structure electrically connects electrodes of adjacent fluorescent tubes to each other.

An eighth technical means is the backlight device as defined in the first technical means, wherein at least one another light source is arranged between two light sources forming a state where electrodes are conducted each other by the conduction structure.

A ninth technical means is the backlight device as defined in the first technical means, wherein each of the electrodes of two of the light sources connected to the conduction structure is held so as to form a channel-shaped discharge path.

A tenth technical means is the backlight device as defined in the first technical means, wherein two of the light sources connected to the conduction structure are supplied with electric signals with the same frequency in which phases are substantially reversed each other.

An eleventh technical means is the backlight device as defined in the first technical means, wherein the conductive holding portion holds the electrodes so as to be attachable/detachable.

A twelfth technical means is the backlight device as defined in the first technical means, wherein the light sources are constituted by external electrode fluorescent lamps.

A thirteenth technical means is a liquid crystal displaying device comprising the backlight device as defined in any one of first to twelfth technical means and a liquid crystal panel illuminated by the backlight device.

Effects of the Invention

According to the present invention, it is possible to realize frame narrowing by a technically reasonable design, without technical limitation for frame narrowing which tends to be considered troublesome when bent-tube type fluorescent tubes having U-shaped or channel-shaped bent portions are alternately arranged to face each other nor without the trouble accompanied with the work of storing the bent-tube type fluorescent tubes in a chassis, which becomes a problem in manufacturing.

Furthermore, according to the present invention, it is possible to uniform distribution of luminance or chromaticity in the whole screen of a larger-sized screen while securing safety in a high-voltage wiring processing with much less number of components such as an inverter transformer.

EXPLANATIONS OF REFERENCE NUMERALS

Figure 1:
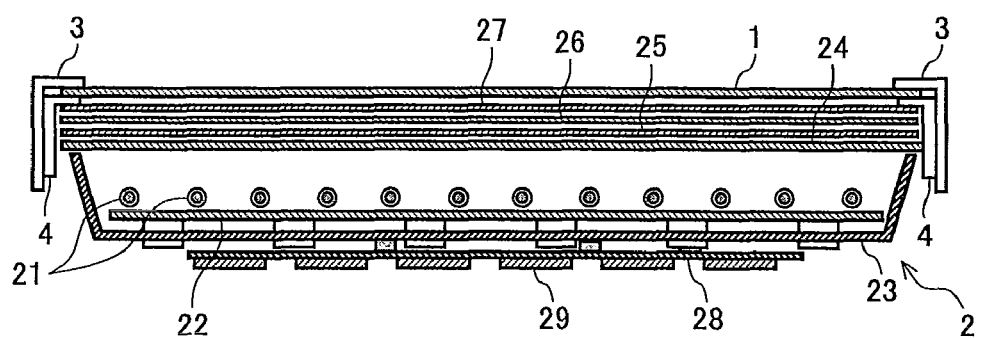
FIG. 1 is a sectional view showing a structural example of a liquid crystal displaying device using a backlight device according to the present invention.

1 . . . liquid crystal panel; 2 . . . backlight device; 3, 4 . . . frame; 21 . . . fluorescent tube; 21a to 21d . . . fluorescent tube unit; 22 . . . reflection sheet; 23 . . . backlight chassis; 24 . . . diffusion plate; 25 . . . diffusion sheet; 26 . . . prism sheet; 27 . . . reflective polarizing plate; 28 . . . inverter circuit board; 29 . . . inverter transformer; 30 . . . storing portion; 31 . . . lamp holding fitting; 32 . . . electrode storing portion; 40 . . . connecting portion; 41 . . . connection fitting; 42 . . . connection fitting receiving portion; 50 . . . lamp holder; 51 . . . groove portion; 211 . . . glass tube; 212 . . . electrode; 213 . . . electrode; 221 . . . glass tube; 222 . . . metal capsule; 231 . . . storing portion through-hole; 281 . . . inverter transformer; 282 . . . inverter transformer, 283 . . . high-voltage line; 284 . . . conduction line; 285 . . . storing portion attachment hole; 286 . . . high-voltage area; 287 . . . connecting portion attachment hole; 291 . . . primary winding; 292 . . . secondary winding; 311 . . . holding portion; 312 . . . foot portion; 321 . . . fitting guide portion; 322 . . . chassis engagement portion; 323 . . . lamp insertion groove; 411 . . . inverter connecting piece; and 412 . . . storing portion connecting piece.

PREFERRED EMBODIMENTS OF THE INVENTION

With reference to the accompanied drawings, preferred embodiments of a backlight device of the present invention will hereinafter be described. Note that, in all of the figures illustrating the embodiments, same reference numeral is given to any portion having the similar function, with repeated description thereof omitted.

FIG. 1 is a sectional view showing a structural example of a liquid crystal displaying device using the backlight device according to the present invention. The liquid crystal displaying device includes a liquid crystal panel 1 and a backlight device 2, as the primary structure.

The liquid crystal panel 1 feeds a video signal to which a video signal processing is applied as a predetermined gradation voltage for each pixel in accordance with a clock signal of the liquid crystal panel 1, and successively applies a video display processing by scanning on a screen to thereby display a video in accordance with the video signal. The liquid crystal panel 1 is composed of two glass boards with a polarizing plate having the crossed Nicol relationship across a liquid crystal layer, and is fixed and held by two frames 3 and 4. The frames 3 and 4 have the structure in which a cross section is bent into a substantially L-shape so as to cover the whole of the backlight device 2.

The backlight device 2 is comprised of a plurality of fluorescent tubes 21 for supplying light to the liquid crystal panel 1, a reflection sheet or a reflection plate (hereinafter represented by the reflection sheet) 22 for effectively irradiating light emitted from each of the fluorescent tubes 21 to the side of the liquid crystal panel 1, and a backlight chassis 23 for storing them. A shape of the reflection sheet 22 may be, for example, a flat shape as shown in FIG. 1 or an indented cross sectional shape. The backlight chassis 23 corresponds to a chassis of the present invention.

Arranged on the rear face of the backlight chassis 23 (that is, the face opposite to the installation face of the fluorescent tubes 21) is an inverter circuit board 28 for mounting an inverter circuit.

The inverter circuit board 28 is provided with components such as an inverter transformer 29 as a step-up circuit for supplying electric power to each of the fluorescent tubes 21. An example of the inverter transformer 29 includes a winding type that transforms a voltage by effect of electromagnetic induction of two coils based on a winding ratio of each of the coils. The inverter circuit board 28 corresponds to the light source lighting circuit board of the present invention, and the inverter transformer 29 corresponds to electric power supplying means of the present invention.

As the inverter circuit, for example, a separately-excited inverter is applicable. The separately-excited inverter is typically provided with an oscillation circuit in the primary side and converts into an alternating current with the same frequency as a drive frequency of the oscillation circuit. In addition, by utilizing the separately-excited inverter to drive the winding-type inverter transformer 29 as described above, it is possible to realize a smaller and more efficient inverter, even though in the winding type, than a piezoelectric-type inverter.

Moreover, the backlight device 2 is provided with a diffusion plate 24 for reducing luminance difference between the installation positions of the fluorescent tubes 21 and other positions. Further, the backlight device 2 is capable of being provided with various optical members depending on optical performance required for the liquid crystal displaying device. For example, a diffusion sheet 25 for supplying optimum light distribution property depending on the used form of the liquid crystal displaying device, a prism sheet 26 for condensing light in a specific direction, a reflective polarizing plate 27 for selectively transmitting/reflecting a polarized wave of the light in the specific direction to improve polarization degree of light incident to the liquid crystal panel 1 and the like are usable. These various optical members (such as the diffusion plate 24, the diffusion sheet 25, the prism sheet 26, and the reflective polarizing plate 27) are constituted into a plate shape or a sheet shape, and are arranged between the fluorescent tubes 21 and the liquid crystal panel 1.

A plurality of fluorescent tubes 21 having a straight-tube type shape are arranged so that the straight parts are in parallel to each other. In the backlight device 2, the inverter circuit board 28 is arranged substantially in parallel on the rear face thereof. In addition, from the inverter transformer 29 mounted on the inverter circuit board 28, a high-voltage alternating current voltage is supplied to the electrodes of the fluorescent tubes 21. Whereby, mercury in the fluorescent tubes 21 is excited and light near the ultraviolet rays is emitted by the energy level thereof.

In the fluorescent tube 21, phosphors of the three colors such as red, blue and green emit light by the above-described ultraviolet light. By mixture of these light emission colors, the light emitted from the fluorescent tube 21 is white light. The light distribution property of the white light that has been emitted in this way is controlled by the above-described various optical members, thus making it possible to supply light effectively to the liquid crystal panel 1. The brightness of the light supplied from the backlight device 2 is controlled with each pixel of the liquid crystal panel 1 and a video is displayed on a screen.

For the fluorescent tube 21 applied to the embodiment of the present invention, a straight-tube type external electrode fluorescent lamp (EEFL (External Electrode Fluorescent Lamp)) is used. The external electrode fluorescent lamp includes an electrode outside the fluorescent lamp, and introduces a plasma into the fluorescent lamp by an electric field of the external electrode to emit light.

Figure 2:
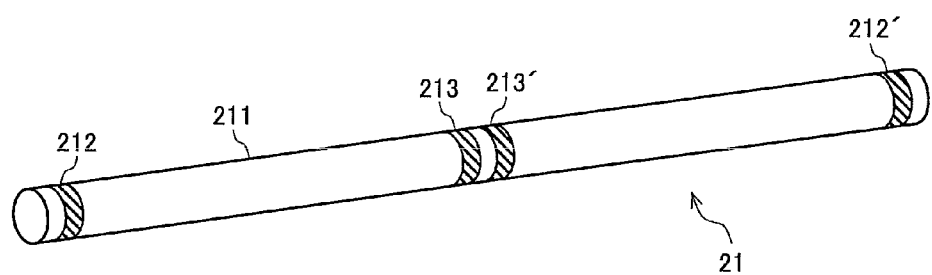
FIG. 2 is an external view showing a belt-type external electrode fluorescent lamp as an example of an external electrode fluorescent lamp.

FIG. 2 is an external view showing a belt-type external electrode fluorescent lamp as an example of an external electrode fluorescent lamp. The fluorescent tube 21 constituted as the belt-type external electrode fluorescent lamp is provided with electrodes 212 and 212' at both ends of a glass tube 211 and is provided with electrodes 213 and 213' at a center part thereof. The electrodes 212 and 212' at the both ends are driven at a high frequency of several MHz or more. Moreover, the electrodes 213 and 213' at the center part can be provided, in particular, when a length of the glass tube 211 is long at a high frequency.

Figure 3:
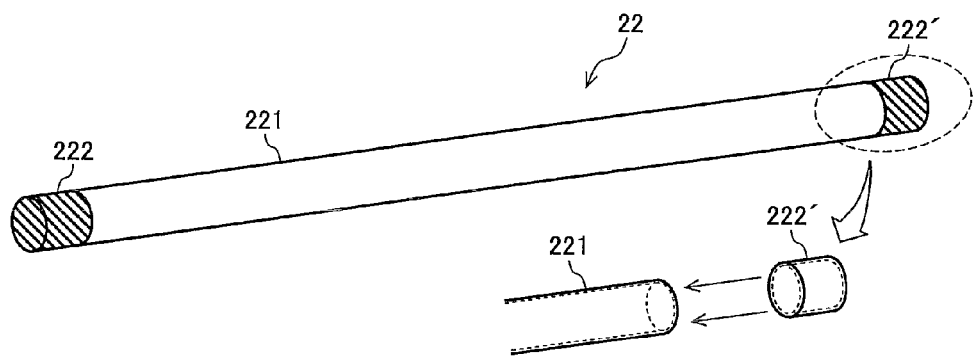
FIG. 3 is an external view showing a metal-enclosed external electrode fluorescent lamp as another example of an external electrode fluorescent lamp (EEFL).

FIG. 3 is an external view showing a metal-enclosed external electrode fluorescent lamp as another example of an external electrode fluorescent lamp (EEFL). The fluorescent tube 21 constituted as the metal-enclosed external electrode fluorescent lamp is provided with metal capsules 222 and 222' at both ends of a glass tube 221. Such a fluorescent tube 21 is used, in particular, when the glass tube 221 has a large diameter.

Further detailed description will be given for an embodiment of the present invention in which the straight-tube type external electrode fluorescent lamp as described above is used.

Figure 4:
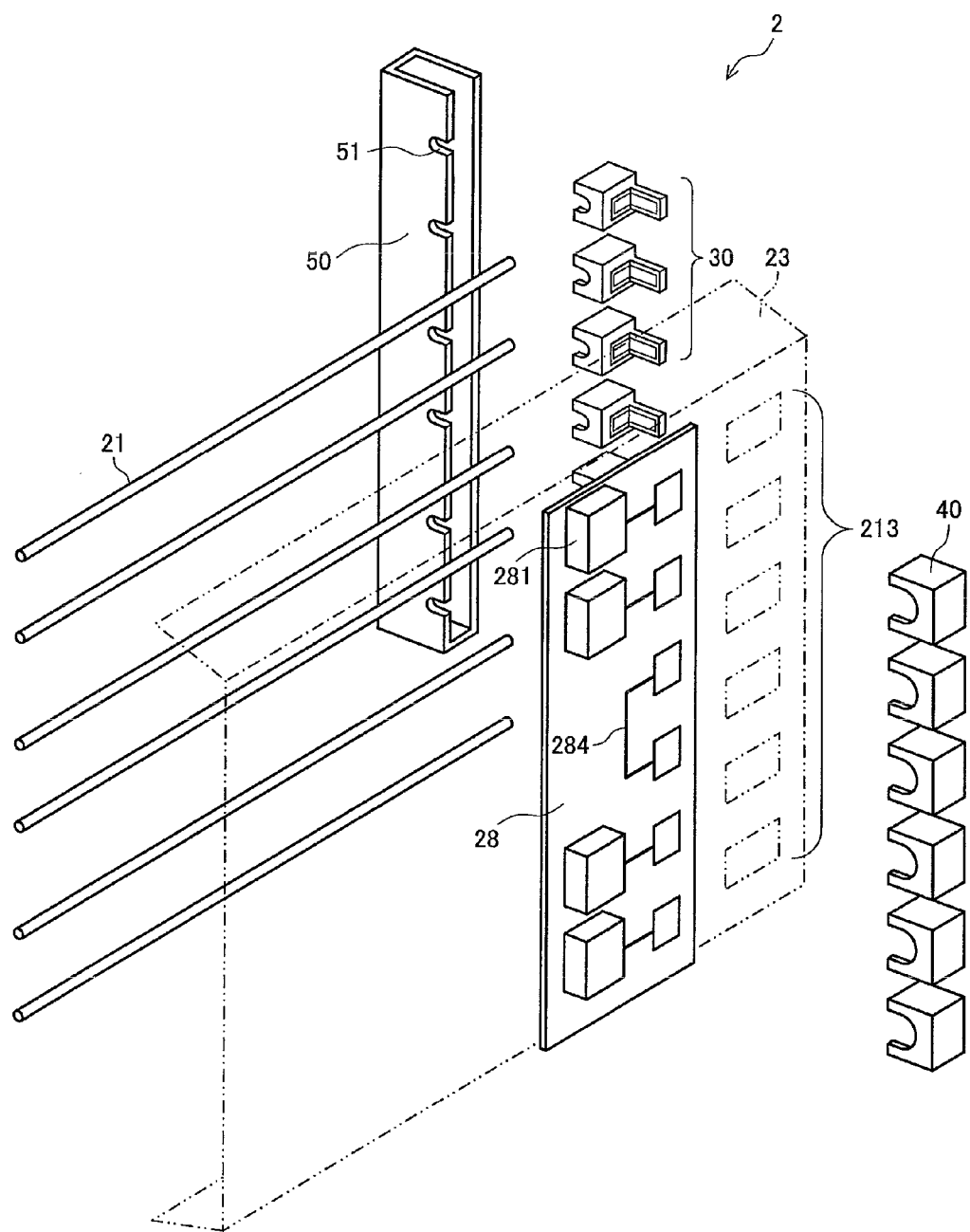
FIG. 4 is a view conceptually illustrating components of a main part of the backlight device according to the present invention and the assemble structure thereof.

FIG. 4 is a view conceptually illustrating components of a main part of the backlight device according to the present invention and the assemble structure thereof.

According to the embodiment concerning the present invention, a plurality of straight-tube type external electrode fluorescent lamps are arranged in parallel.

That is, the backlight device 2 includes the fluorescent tubes 21 serving as a light source, the backlight chassis 23 in which the plurality of fluorescent tubes 21 are stored in a row, and the inverter circuit board 28 included on the rear face of the backlight chassis 23. As the fluorescent tubes 21, the external electrode fluorescent lamps as described above are applied.

The backlight device 2 of the present embodiment has the storing portion 30 attached to the backlight chassis 23. The storing portion 30 stores a conductive holding portion (conductor-type holding portion) that holds the external electrodes of the fluorescent tubes 21. The conductor-type holding portion holds the electrodes of the external electrode fluorescent lamp so as to be attachable/detachable. The external electrodes of the fluorescent tubes 21 held by the conductor-type holding portion of the storing portion 30 correspond to the electrodes 212 and 212' in the example of FIG. 2 and correspond to the metal capsules 222 and 222' in the example of FIG. 3.

In addition, by attaching the storing portion 30 to the backlight chassis 23, the electrodes of the fluorescent tubes 21 form a state of being electrically connected to the inverter circuit board 28 provided on the rear face of the backlight chassis 23.

Here, a storing portion through-hole 231 allowing the storing portion 30 to pass through is provided at a side end of the backlight chassis 23. When a part of the storing portion 30 passes through the storing portion through-hole 231, the conductive holding portion stored in the storing portion 30 and a connecting portion 40 included in the inverter circuit board 28 form a connected state. Thereby, the fluorescent tubes 21 are electrically connected to inverter transformers 281 mounted on the inverter circuit board 28. The inverter transformer 281 corresponds to the inverter transformer 29 with the structure of FIG. 1.

The inverter circuit boards 28 are provided as a pair to give the connected structure at both ends of the fluorescent tubes 21 (only one of the inverter circuit boards 28 is shown in FIG. 4).

In addition, the inverter circuit board 28 includes conduction means for connecting electrodes of two fluorescent tubes 21 of the fluorescent tubes 21 that are arranged in a row. The conduction means is realized by a conduction line 284 included on the inverter circuit board 28. A specific structural example of the inverter circuit board 28 will be described below.

The lamp holder 50 covers the conductive holding portion, that holds the fluorescent tubes 21, from the inner face of the backlight chassis 23. The lamp holder 50 is provided with groove portions 51, and when the lamp holder 50 is attached to the backlight chassis 23, the fluorescent tubes 21 are arranged in the groove portions 51. With this structure, the electrodes of the two fluorescent tubes 21 connected by the conduction means are held by the conductor-type holding portion, thus forming a channel-shaped (squared U-shape) discharge path.

Figure 5:
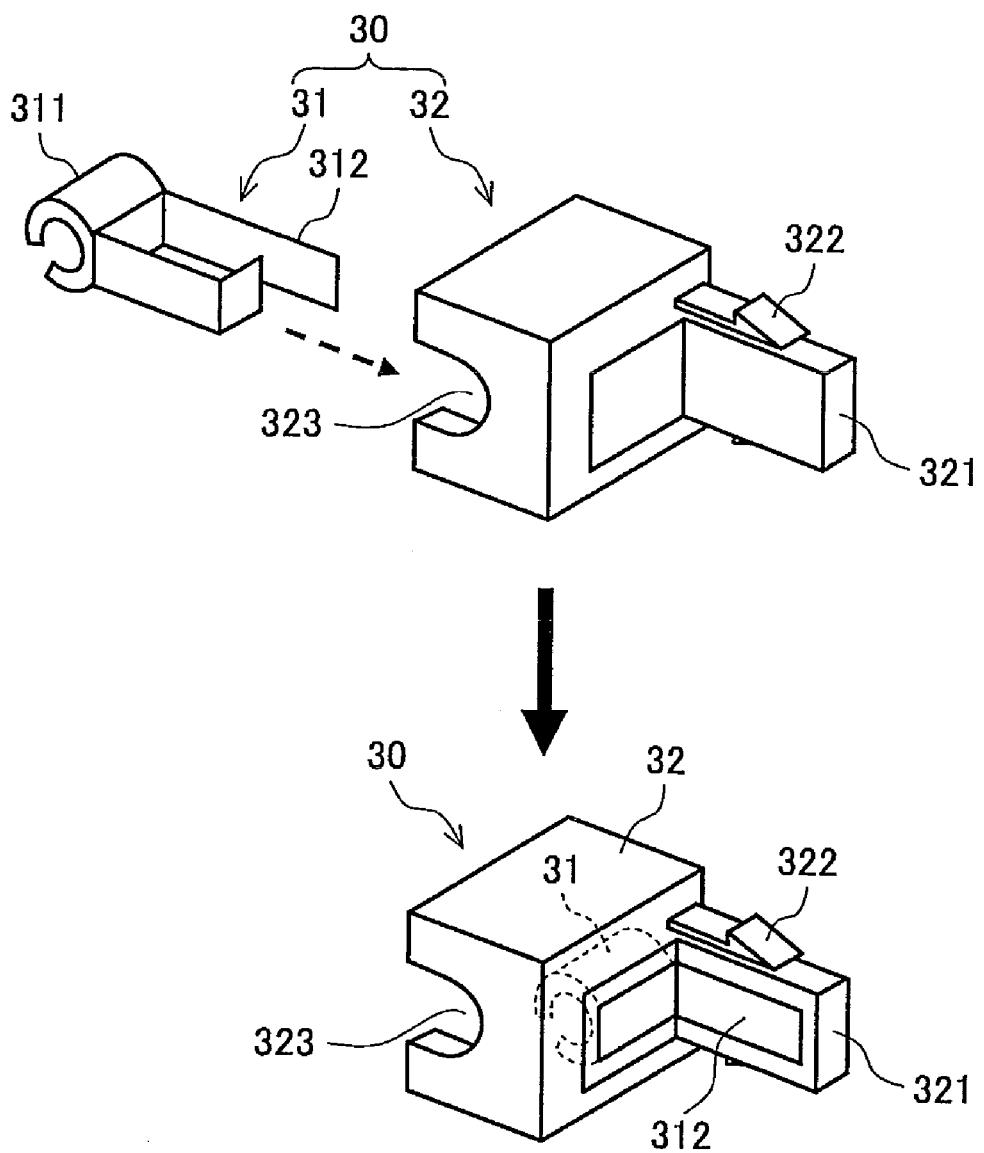
FIG. 5 is a view illustrating a structural example of a storing portion applied to the present invention.

FIG. 5 is a view illustrating a structural example of the storing portion applied to the present invention. The storing portion 30 is a component that places the fluorescent tube 21 with respect to the backlight chassis 23 while holding the electrode of the fluorescent tube 21 directly.

The storing portion 30 has a conductive lamp holding fitting 31 for directly holding the electrode of the fluorescent tube 21 and an electrode storing portion 32 that is attached to the bottom surface or the side surface of the backlight chassis 23 with the lamp holding fitting 31 holding the fluorescent tube 21 stored therein. The lamp holding fitting 31 corresponds to an electrode holding portion of the present invention that holds the electrode of the fluorescent tube stored in the storing portion 30. In addition, the electrode storing portion 32 has a function of placing a mounted position of the fluorescent tube 21 with respect to the backlight chassis 23.

The lamp holding fitting 31 has a holding portion 311 for holding the fluorescent tube 21 and a foot portion 312 for mounting in the inverter circuit board 28.

Moreover, the electrode storing portion 32 has a fitting guide portion (projecting portion) 321, a claw-shaped chassis engagement portion 322, and a cutout-shaped lamp insertion groove 323.

When the foot portion 312 of the lamp holding fitting 31 is inserted in a determined direction and position with respect to the fitting guide portion 321, the foot portion 312 is pulled out to the rear face side of the backlight chassis 23.

Further, the chassis engagement portion 322 is engaged with the backlight chassis 23 in a state where the fitting guide portion (projecting portion) 321 passes through the storing portion through-hole 231 of the backlight chassis 23. Thereby, the storing portion 30 is fixed to the backlight chassis 23. A pair of chassis engagement portions 322 is included in a single electrode storing portion 32.

Moreover, the electrode of the fluorescent tube 21 is inserted in the lamp insertion groove 323. Here, the electrode of the fluorescent tube 21 arranged in parallel inside of the backlight chassis 23 and held by the holding portion 311 is inserted in the lamp insertion groove 323 at a predetermined position in the electrode storing portion 32.

Figure 6:
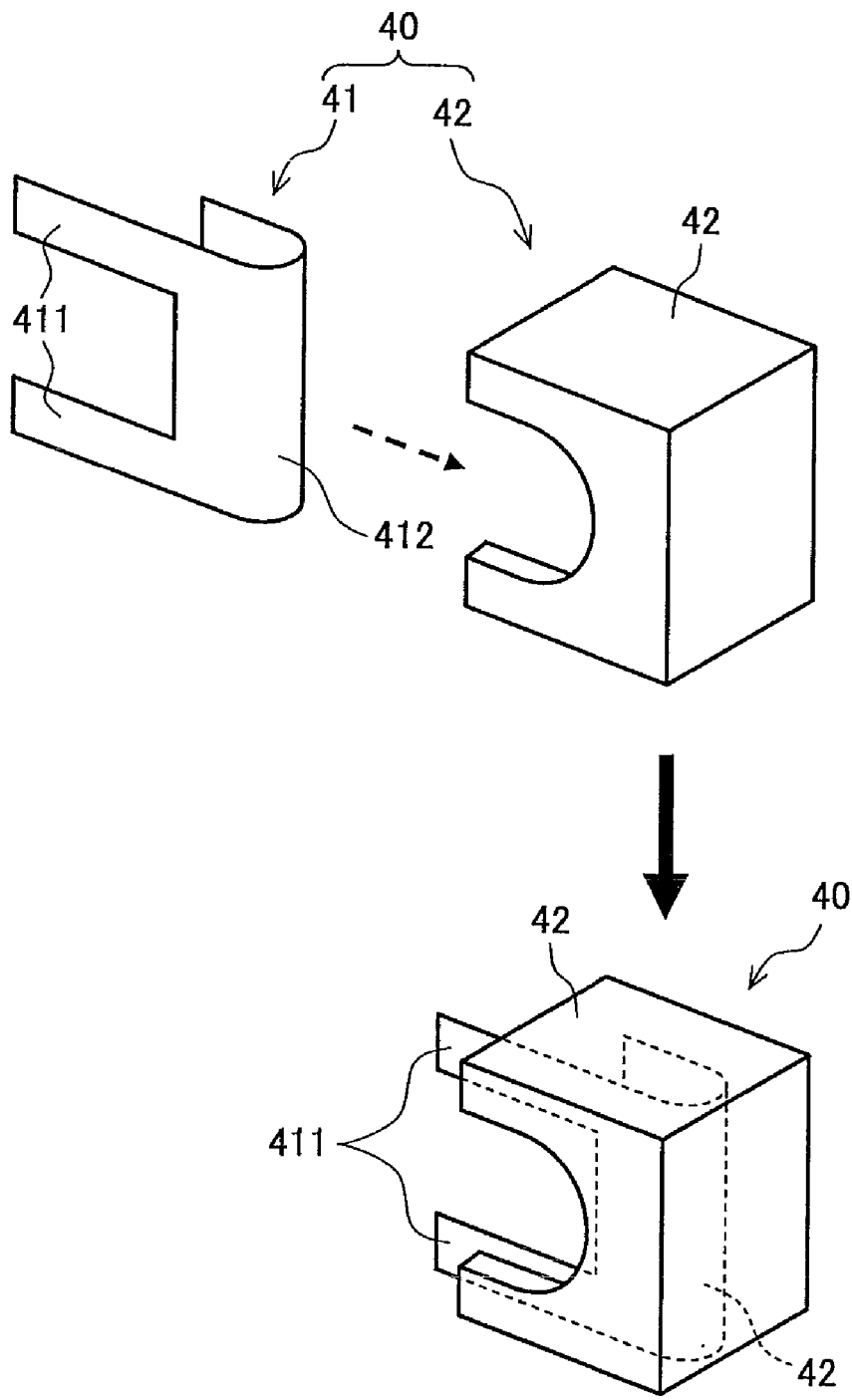
FIG. 6 is a view illustrating a structural example of a connecting portion applied to the present invention.

FIG. 6 is a view illustrating a structural example of the connecting portion applied to the present invention. The connecting portion 40 is comprised of a connection fitting 41 and a connection fitting receiving portion 42.

The connection fitting 41 is in contact with the above-described lamp holding fitting 31 to thereby form a state of being electrically connected to the inverter circuit board 28. In addition, the connection fitting receiving portion 42 receives the connection fitting 41 so that the connection fitting 41 is mounted in a fixed position and direction on the inverter circuit board 28.

The connection fitting 41 has an inverter connecting piece 411 for connecting to a mounted pattern on the inverter circuit board 28 and a storing portion connecting piece 412 that is molded by bending a part of the connection fitting 41 so as to be in contact with the lamp holding fitting 31 of the storing portion 30. By bending the connection fitting 41, it is possible to reliably obtain the contact state of the storing portion connecting piece 412 and the lamp holding fitting 31 by action of a fixed restoring force of a spring.

Figure 7:
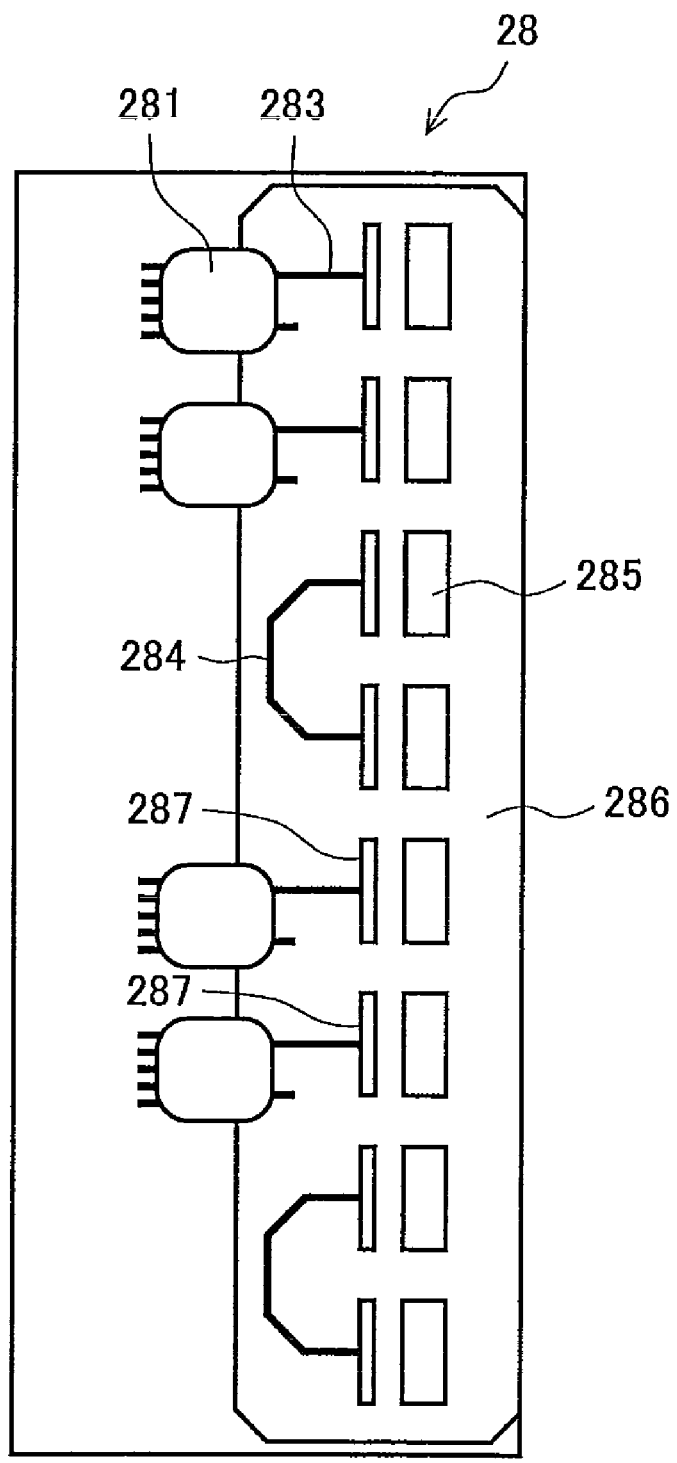
FIG. 7 is a view illustrating a structural example of an inverter circuit board applied to the present invention.

FIG. 7 is a view illustrating a structural example of the inverter circuit board applied to the present invention.

As described above, the inverter circuit boards 28 are provided as a pair to be connected to the both ends of the fluorescent tubes 21 that are arranged in a row.

The inverter circuit board 28 of the present example is mounted with the inverter transformers (one-input/one-output type) 281, a high-voltage line 283 and the conduction line 284, and is further provided with a storing portion attachment hole 285 and a connecting portion attachment hole 287.

The high-voltage line 283 is a wiring pattern for supplying a high-voltage alternating current voltage increased through the inverter transformers 281 to the fluorescent tubes 21. Moreover, the conduction line 284 is a wiring pattern provided on the inverter circuit board 28 to electrically connect two fluorescent tubes 21 to each other. The conduction line 284 can be formed by pattern printing on the inverter circuit board 28, thereby thickness does not become excessive and it is possible to solve luminance unevenness of a large-sized backlight with the simple structure without requiring mounting work for other conduction means.

In the structure of this example, the inverter transformers 281 are connected to each of the plurality of fluorescent tubes 21 that are arranged in parallel, and the high-voltage alternating current voltage is supplied to the fluorescent tubes 21 by each of the inverter transformers 281. In addition, in a pair of fluorescent tubes 21 adjacent to each other, the electrodes in the side opposite to the side where the high-voltage alternating current voltage is supplied are connected by the conduction line 284. That is, the pair of fluorescent tubes 21 is connected by the conduction line 284, so that similar action to the bent-tube type fluorescent tube in a U-shape or channel-shape is obtained. Description will be given here with the pair of fluorescent tubes 21 connected by the conduction line 284 as a fluorescent tube unit.

In this example, the fluorescent tube unit is comprised of the adjacent pair of fluorescent tubes 21. In addition, the inverter circuit board 28 is constituted so that the high-voltage side (connection side to the inverter transformer 281) and the connection side by the conduction line 284 in the fluorescent tube unit alternate in the arrangement direction of the fluorescent tubes 21.

Thereby, it is possible to obtain similar effect to the case where the electrode side and the bent-portion side of the bent-tube type fluorescent tube are arranged alternately, that is, effect of reducing luminance unevenness and color unevenness of illumination light.

The storing portion attachment hole 285 is formed to allow a part protruding to the rear face side of the backlight chassis 23 (the fitting guide portion 321) of the storing portion 30 attached to the backlight chassis 23 to pass through. In addition, by allowing a part of the storing portion 30 to pass through the storing portion attachment hole 285, the lamp holding fitting 31 is electrically connected to the high-voltage line 283 or the conduction line 284. This makes it possible to supply the high-voltage alternating current voltage from the inverter transformers 281 to the fluorescent tubes 21, and to form the electrically connected state between two fluorescent tubes that are arranged in a U-shape to be connected in series by the conduction line 284 that connects between the connecting portion attachment holes 287 corresponding to positions where each of the fluorescent tubes is placed.

The connecting portion attachment hole 287 is a through-hole for attaching the connecting portion 40. The connecting portion 40 is used, as described above, to electrically connect the lamp holding fitting 31 of the storing portion 30 and the high-voltage line from the inverter transformer 29. As described above, the connecting portion 40 encloses the connection fitting 41. The connection fitting 41 is connected to the lamp holding fitting 31 of the storing portion 30 protruding to the rear face of the backlight chassis 23.

The connecting portion 40 is attached on the inverter circuit board 28 using the connecting portion attachment hole 287 so as to cover the storing portion 30 protruding from the rear face of the backlight chassis 23. The connecting portion attachment hole 287 is designed so that a plurality of pieces are arranged in the arrangement direction of the fluorescent tubes 21 when the inverter circuit board 28 is mounted on the rear face of the backlight chassis 23.

Moreover, a high-voltage area 286 is an area for warning danger of a discharging phenomenon by the high-voltage line 283 and calling worker's attention, which typically indicates a silk printing area in which a notice of "CAUTION, HIGH VOLTAGE" is applied.

The above-described conduction line 284 is provided in the high-voltage area, thus, even when one of the fluorescent tubes is not connected to the conduction line, resulting that there arises a danger of electric leakage from the electrodes of the other fluorescent tube, it is possible to draw worker's attention and to secure safety of a product.

The attachment mechanism of the fluorescent tubes 21 by the connecting portion 40 and the storing portion 30 as described above enables to supply the high-voltage electric power to the fluorescent tubes 21 through a fitting that conducts the high-voltage alternating current voltage with a simple assembling step.

Figure 8:
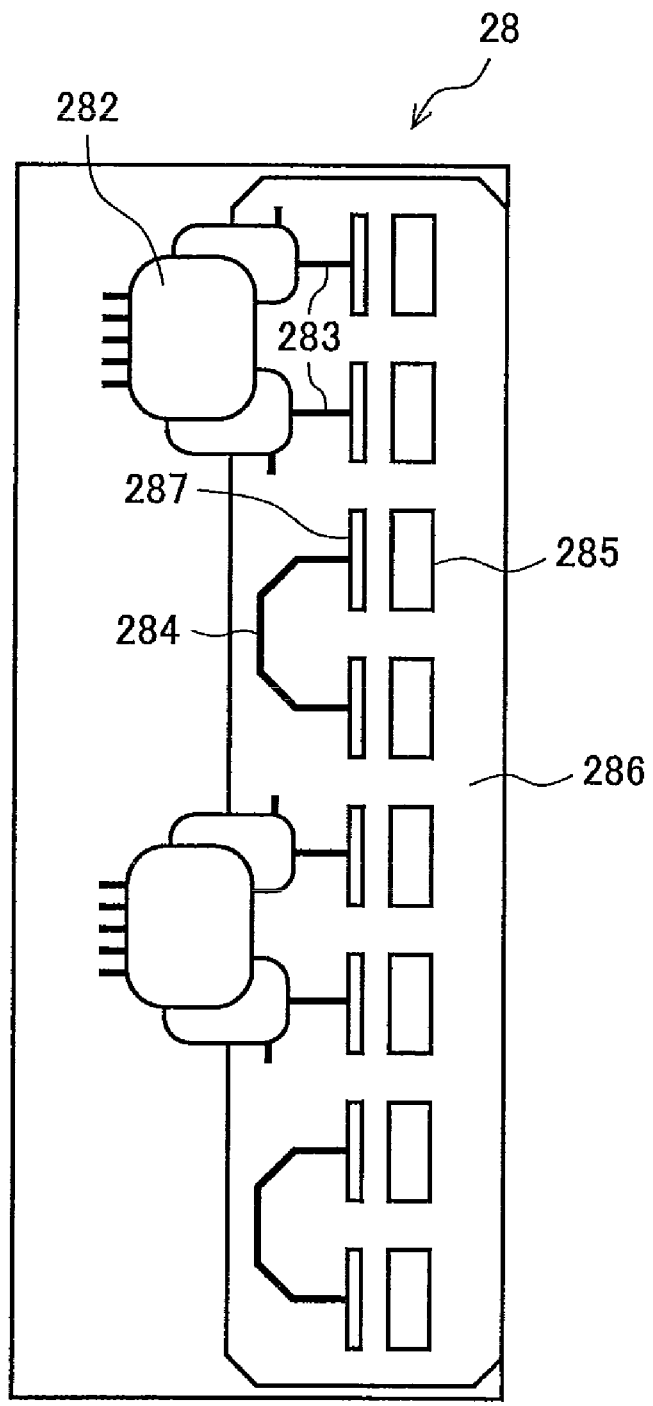
FIG. 8 is a view illustrating another structural example of the inverter circuit board applied to the present invention.

FIG. 8 is a view illustrating another structural example of the inverter circuit board applied to the present invention.

The inverter circuit board in this example lights and drives a single fluorescent tube unit composed of a pair of adjacent fluorescent tubes 21 using a single one-input/one-output type inverter transformer 282. Electrodes in the opposite side to the high-voltage side of the two fluorescent tubes 21 that are lit and driven by the inverter transformer 282 are connected by the conduction line 284.

Other structures in FIG. 8 are similar to the example of FIG. 7, thus repeated description thereof will be omitted.

Figure 9:
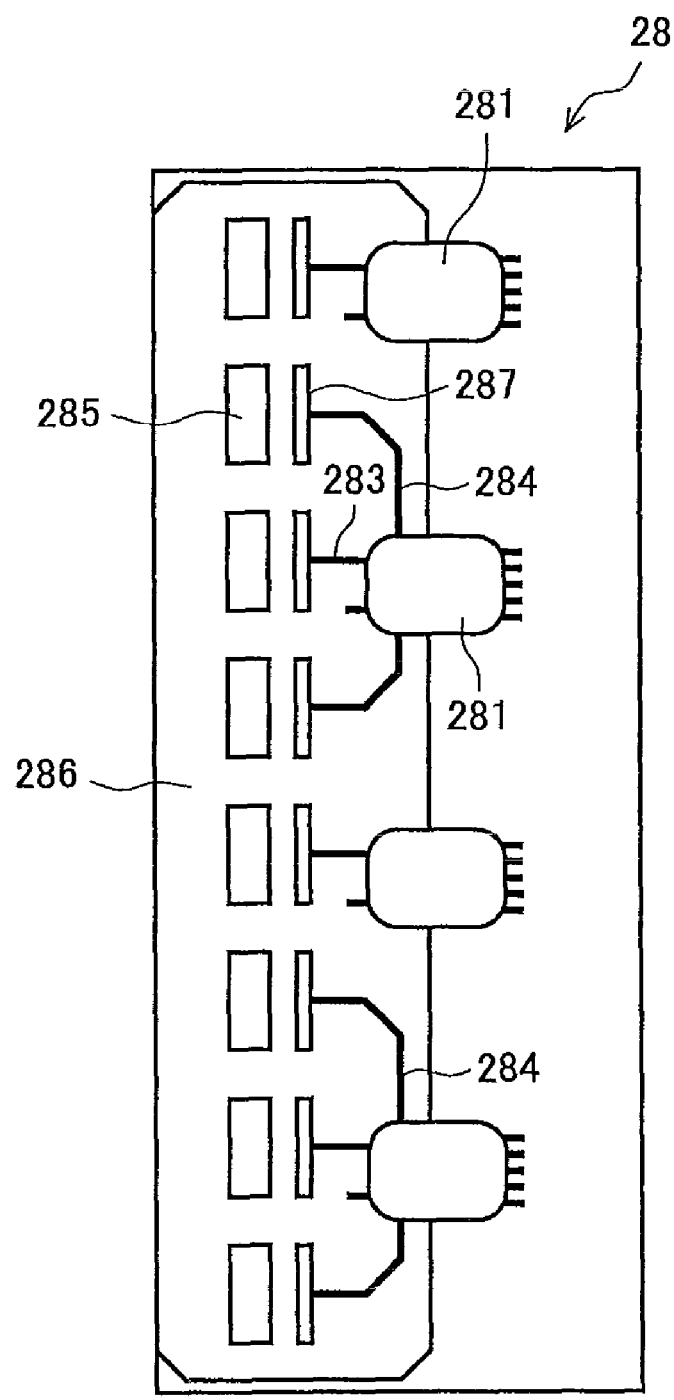
FIG. 9 is a view illustrating still another structural example of the inverter circuit board applied to the present invention.

FIG. 9 is a view illustrating still another structural example of the inverter circuit board applied to the present invention. The inverter circuit board 28 in this example lights and drives each of the fluorescent tubes 21 using a single one-input/one-output type inverter transformer 281. Electrodes in the opposite side to the high-voltage side of the two fluorescent tubes 21 that are lit and driven by the inverter transformer 281 are connected by the conduction line 284, and constitute a fluorescent tube unit.

At this time, in this example, the pair of fluorescent tubes 21 constituting a single fluorescent tube unit is constituted so that one fluorescent tube 21 of another fluorescent tube unit is arranged therebetween. Accordingly, in a single inverter circuit board 28, the storing portion 30 connected to the inverter transformer 281 and the storing portion 30 connected to the conduction line 284 are alternately arranged in the arrangement direction of the fluorescent tubes 21. In this case, the conduction line 284 is formed in a state of passing through the lower face of the inverter transformer 281 so as not to be in contact with the high-voltage line 283 connected to the adjacent fluorescent tubes 21.

Other structures in FIG. 9 are similar to the example of FIG. 7, thus repeated description thereof will be omitted.

Figure 10:
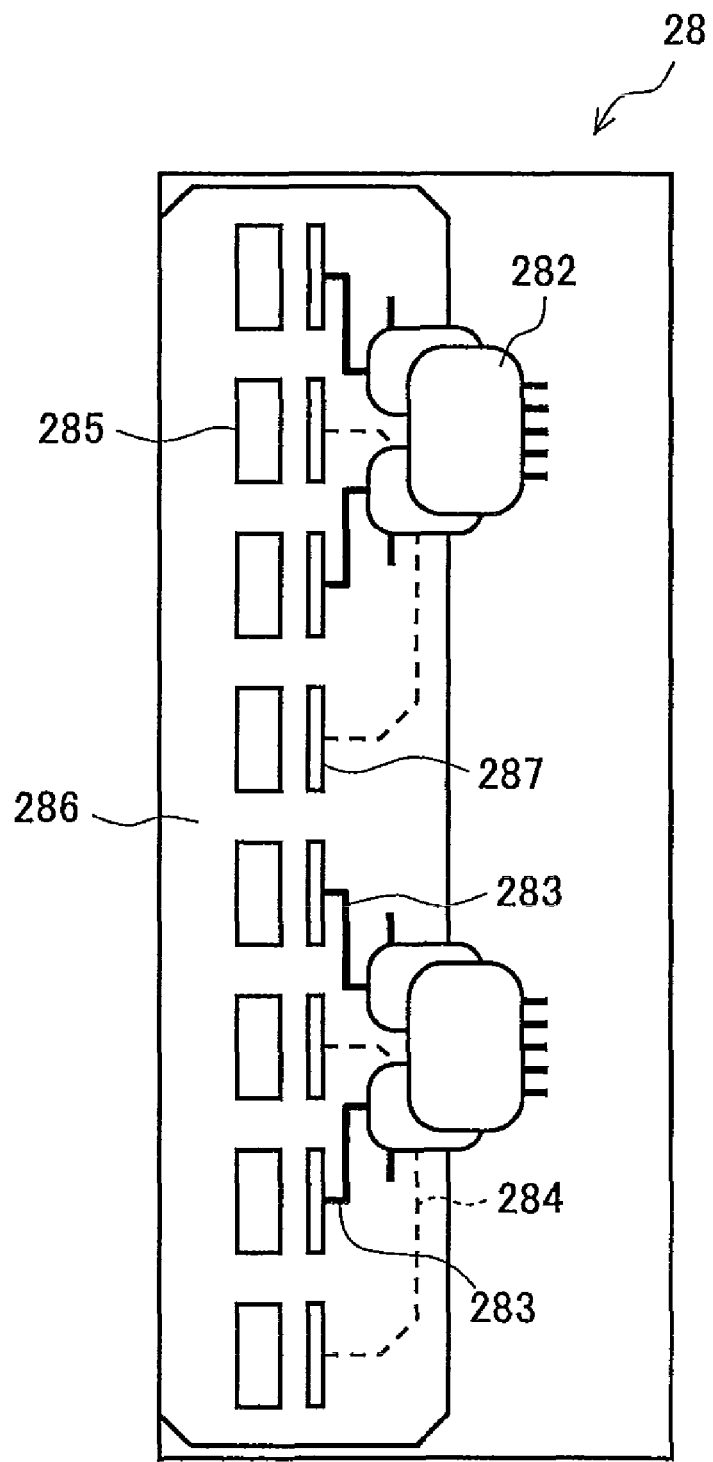
FIG. 10 is a view illustrating still another structural example of the inverter circuit board applied to the present invention.

FIG. 10 is a view illustrating still another structural example of the inverter circuit board applied to the present invention. The inverter circuit board 28 in this example lights and drives a fluorescent tube unit composed of a pair of fluorescent tubes 21 using a single one-input/two-output type inverter transformer 282. Electrodes in the opposite side to the high-voltage side of the two fluorescent tubes 21 that are lit and driven by the inverter transformer 282 are connected by the conduction line 284.

In this example, similarly to the example of FIG. 9, the pair of fluorescent tubes 21 constituting a single fluorescent tube unit is constituted so that one fluorescent tube 21 of another fluorescent tube unit is arranged therebetween. Accordingly, in a single inverter circuit board 28, the storing portion 30 connected to the inverter transformer 282 and the storing portion 30 connected to the conduction line 284 are alternately arranged in the arrangement direction of the fluorescent tubes 21. In this case, the conduction line 284 is formed on the rear face of the inverter transformer 282, that is, the opposite face to the face where the wiring pattern for supplying electric power from the inverter circuit board 28 to the fluorescent tubes 21 is included, so as not to be in contact with the high-voltage line 283 connected to adjacent fluorescent tubes 21.

Other structures in FIG. 10 are similar to the example of FIG. 7, thus repeated description thereof will be omitted.

In each of the above-described structures of FIGS. 7 to 10, electrodes in one side of a pair of fluorescent tubes 21 are connected to each other by the conduction line 284, and electrodes in the other side are connected to the inverter transformer 282 having two secondary windings for a single primary winding so as to perform lighting and driving. At this time, by supplying the high-voltage alternating current voltage increased at a predetermined step-up ratio in a state where phases are reversed each other by each of the secondary windings to each of the electrodes in the other side of the pair of fluorescent tubes 21, it is possible to differentially (floating) drive two fluorescent tubes connected in series. Thereby, even in the case of a fluorescent tube unit that requires a higher discharge voltage than a single fluorescent tube with the same size, such as two fluorescent tubes connected in series, it is possible to supply a discharge voltage sufficiently, in addition, it is possible to suppress a luminance reduction phenomenon that is likely to be generated gradually from the high-voltage side of the fluorescent tubes to the length direction thereof, by inputting electric power from both sides of the fluorescent tube unit. As a result, it is possible to form more uniform light emission distribution even with the long fluorescent tubes. Note that, the described "predetermined step-up ratio" is approximately designed as a value almost equal to a winding ratio of the primary winding and the secondary winding to a core material, in the case of a wound transformer.

In addition, the structure may be provided such that, the high-voltage alternating current voltage is supplied to one fluorescent tube 21 of the pair of fluorescent tubes 21 in the fluorescent tube unit, and the electrode in the side not connecting the conduction line 284 of the electrodes of the other fluorescent tube 21 is grounded to perform single-sided driving in the fluorescent tube unit.

Further, with respect to these driving methods, between the fluorescent tubes connected in series as shown in FIG. 9, the fluorescent tube connected in series to another fluorescent tube is arranged in parallel to each other so that conduction lines 284 connected to each of the fluorescent tube units are formed at both ends of the electrodes of the fluorescent tubes, respectively, thereby enhancing the performance of compensating luminance unevenness of the backlight. That is, with respect to the tendency that the electrode in the high-voltage side of the fluorescent tube is brighter than the other electrode due to influence of a leakage current and the like, the electrodes of adjacent fluorescent tubes compensate the tendency each other more easily, and it is possible to solve luminance unevenness not only in the length direction of the lamp but also in the arrangement direction simultaneously. This effect is more effective means in a large-sized backlight with almost 40-inch (inch size) or more, in particular.

Figure 11:
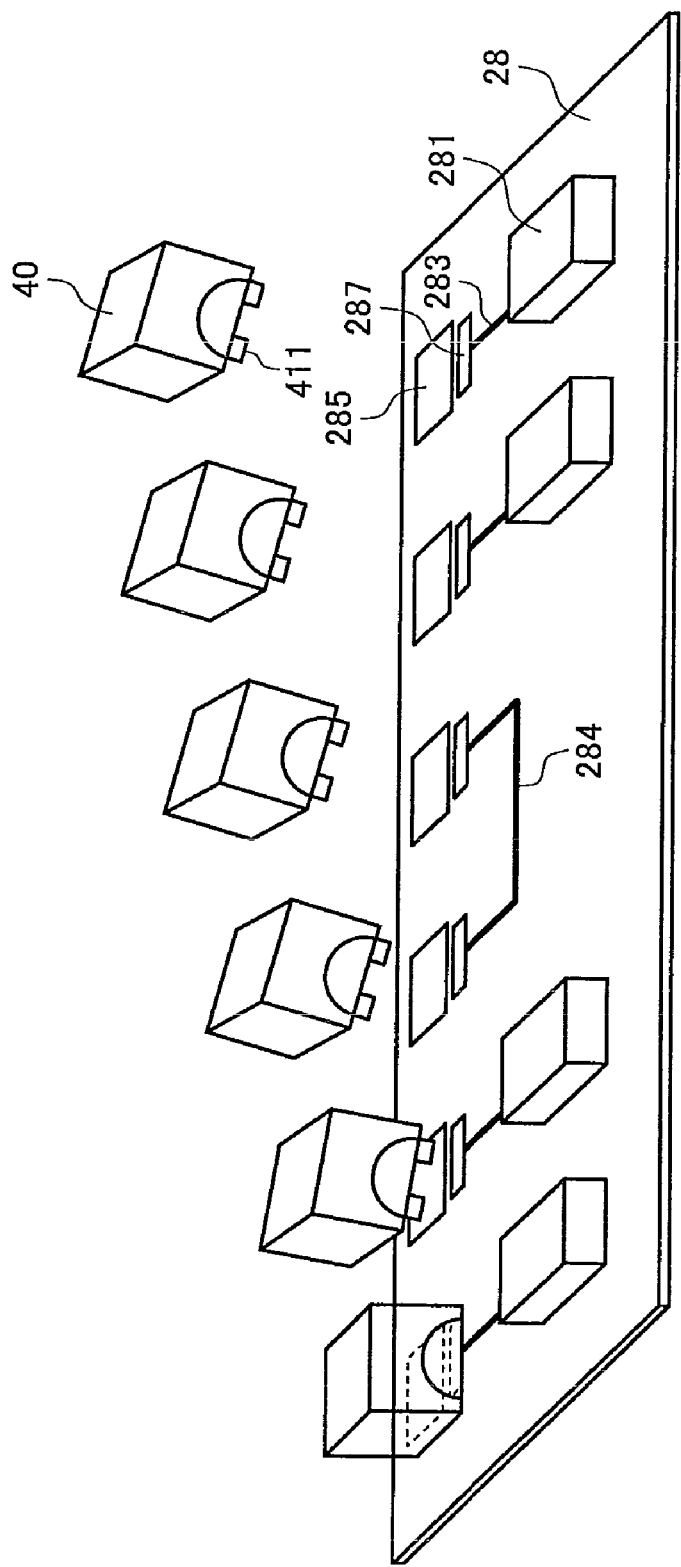
FIG. 11 is a view illustrating a preprocessing for the inverter circuit board applied to the present invention.

FIG. 11 is a view illustrating pre-processing for the inverter circuit board applied to the present invention. Before the inverter circuit board 28 is attached to the backlight chassis 23, a processing of mounting the connecting portions 40 for connecting the fluorescent tubes 21 and the inverter transformer 281 (282) on the inverter circuit board 28 in advance is performed.

Specifically, first, the inverter connecting pieces 411 protruding from the connection fitting receiving portions 42 of each of the connecting portions 40 are sequentially inserted into the connecting portion attachment holes 287 provided on the inverter circuit board 28. Subsequently, by performing a soldering processing together with other discrete-type electronic components (such as an inverter transformer and a capacitor), each of the connecting portions 40 is mounted on the inverter circuit board 28 reliably.

After two inverter circuit boards 28 mounted with a plurality of connecting portions 40 are produced as a pair in this way, these inverter circuit boards 28 are attached to the backlight chassis 23 and each of the connecting portions 40 is mounted on the rear face position of the electrodes of the fluorescent tubes 21 that are arranged in parallel.

FIGS. 12 to 15 are views illustrating a step of assembling the backlight device including the connection structure of the fluorescent tubes as described above.

Figure 12:
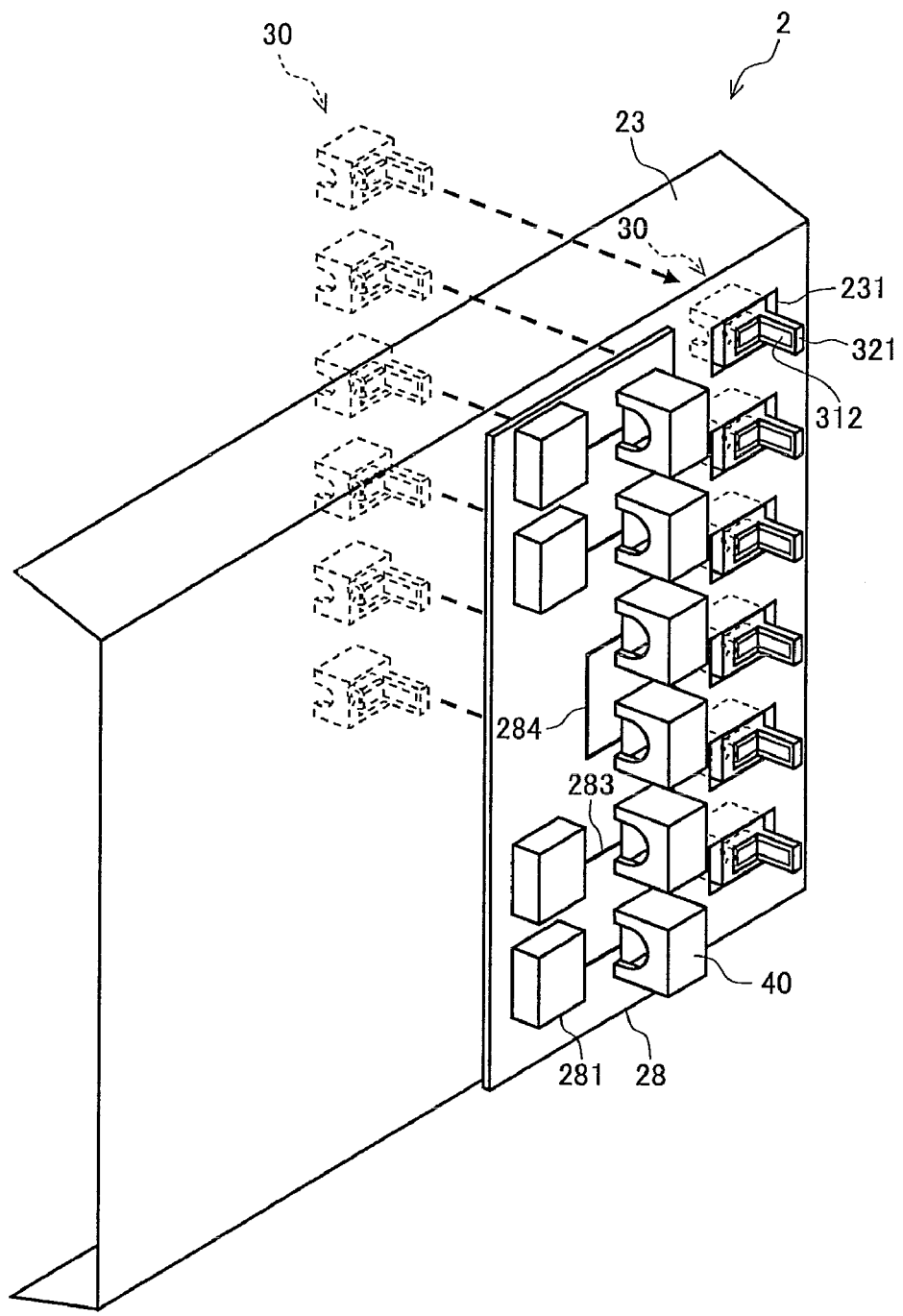
FIG. 12 is a view illustrating a step of assembling the backlight device including the connection structure of fluorescent tubes.

In FIG. 12, first, a plurality of storing portions 30 are prepared depending on the number of the fluorescent tubes 21 to be used. As described above, each of the storing portions 30 is comprised of the lamp holding fitting 31 including the holding portion 311 that holds the fluorescent tube 21 and the electrode storing portion 32 that stores the electrode of the fluorescent tube 21 held by the lamp holding fitting 31.

These prepared storing portions 30 are attached to the storing portion through-holes 231 of the backlight chassis 23. In this case, the fitting guide portions 321 of the storing portions 30 are inserted into the storing portion through-holes 231 from inside of the backlight chassis 23 so as to protrude leading ends of the fitting guide portions 321 to the rear face side of the backlight chassis 23. At this time, the chassis engagement portions 322 of the electrode storing portions 32 are engaged with the backlight chassis 23 so as to regulate the thickness direction of the backlight, thereby the storing portions 30 are fixed to the backlight chassis 23.

Moreover, a pair of inverter circuit boards 28 is additionally prepared (only a single inverter circuit board 28 is illustrated in FIG. 12). The inverter circuit board 28 is mounted with the inverter transformer 281 as described above, and is provided with the high-voltage line 283 for supplying the high-voltage alternating current voltage increased through the inverter transformer 281 to the fluorescent tubes 21 and the conduction line 284 for electrically connecting the electrodes of a pair of fluorescent tubes 21.

In addition, the connecting portions 40 are attached to the connecting portion attachment holes 287 of the inverter circuit board 28 as shown in FIG. 11 and the soldering processing is performed. Thereby, the storing portion connecting pieces 41 of the connecting portions 40 are electrically connected to the high-voltage line 283 or the conduction line 284 provided on the inverter circuit board 28.

Note that, the example using the inverter circuit board 28 having the structure shown in FIG. 7 is shown, here.

Figure 13:
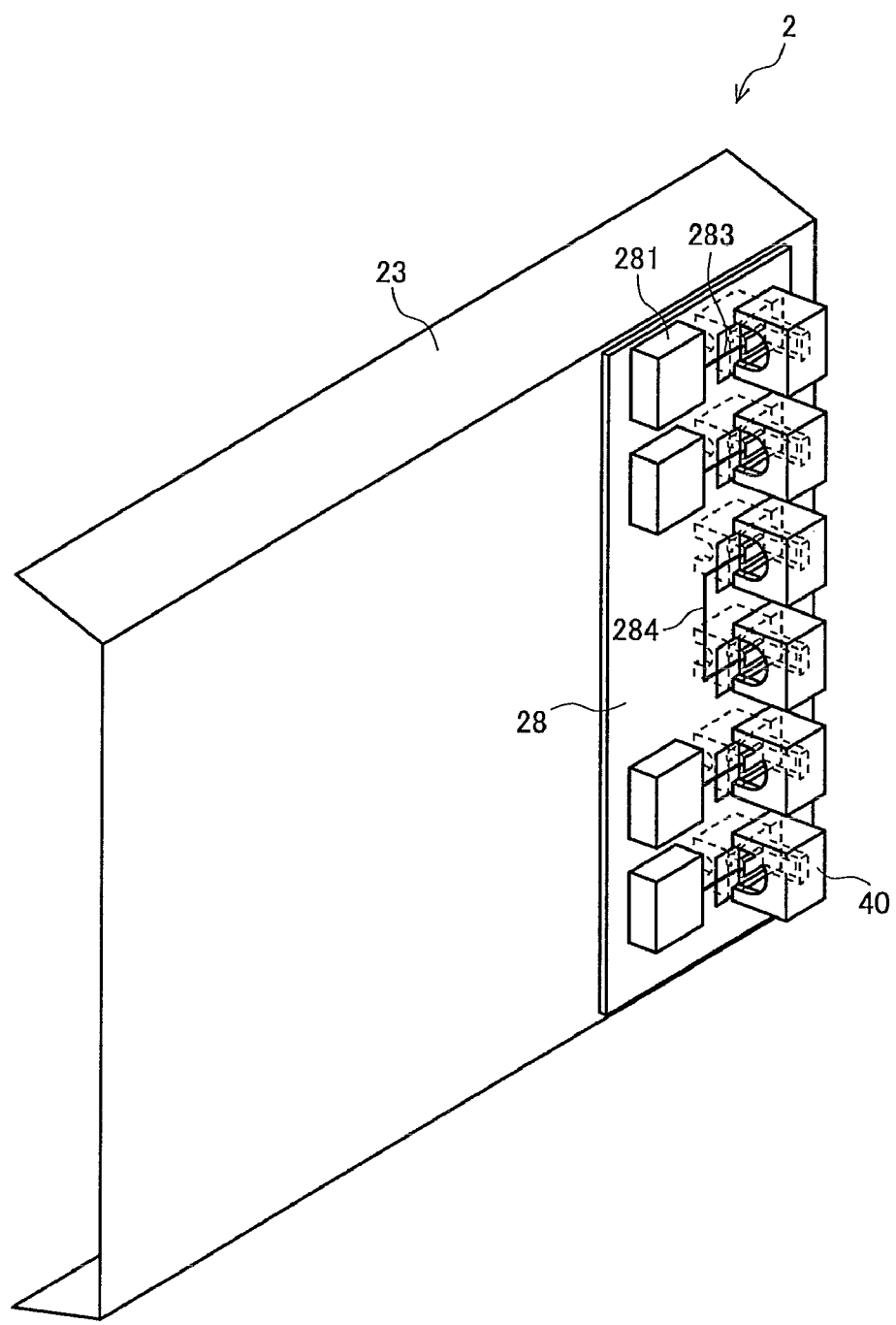
FIG. 13 is a view illustrating a step of assembling the backlight device including the connection structure of fluorescent tubes.

As shown in FIG. 13, the connecting portions 40 of the inverter circuit board 28 are connected to the storing portions 30 attached to the backlight chassis 23 to fix the inverter circuit board 28. In this case, the fitting guide portions 321 of the storing portions 30 are engaged with the storing portion connecting pieces 412 of the connecting portions 40, and the lamp holding fittings 31 of the storing portions 30 and the storing portion connecting pieces 412 of the connecting portions 40 are electrically connected. The storing portion connecting pieces 412 and the high-voltage line 283 or the storing portion connecting pieces 412 and the conduction line 284 are electrically connected, thus the high-voltage line 283 and the electrodes of the fluorescent tubes 21 or the conduction line 284 and the electrodes of the fluorescent tubes 21 are electrically connected.

In this assembling, for example, even when the inverter circuit board 28 is not fitted to the backlight chassis 23 and the inverter circuit board 28 therefore presses the fitting guide portions 321 unexpectedly, as described above, the electrode storing portions 32 are engaged with the backlight chassis 23 so as to regulate action in the thickness direction of the backlight and are therefore hardly come off the backlight chassis 23, thus not acting as a force of pressing the held fluorescent tube, which enables to prevent the lamp from being broken in the assembling work.

Figure 14:
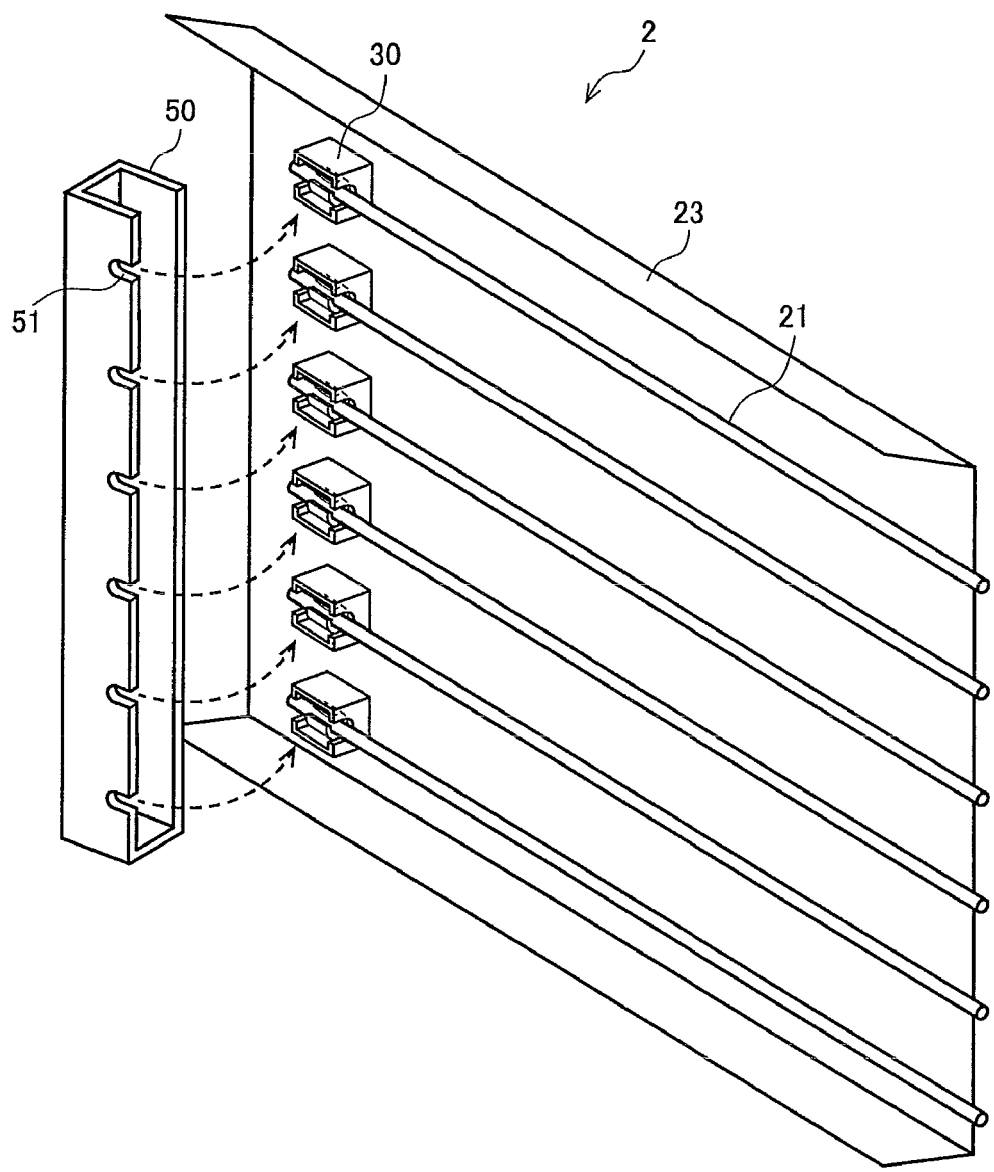
FIG. 14 is a view illustrating a step of assembling the backlight device including the connection structure of fluorescent tubes.

Next, as shown in FIG. 14, the backlight chassis 23 is turned over, and the lamp holder 50 is attached from inside of the backlight chassis 23 (side opposite to the inverter circuit board 28) so that fluorescent tubes 21 are arranged in the groove portions 51 of the lamp holder 50.

Figure 15:
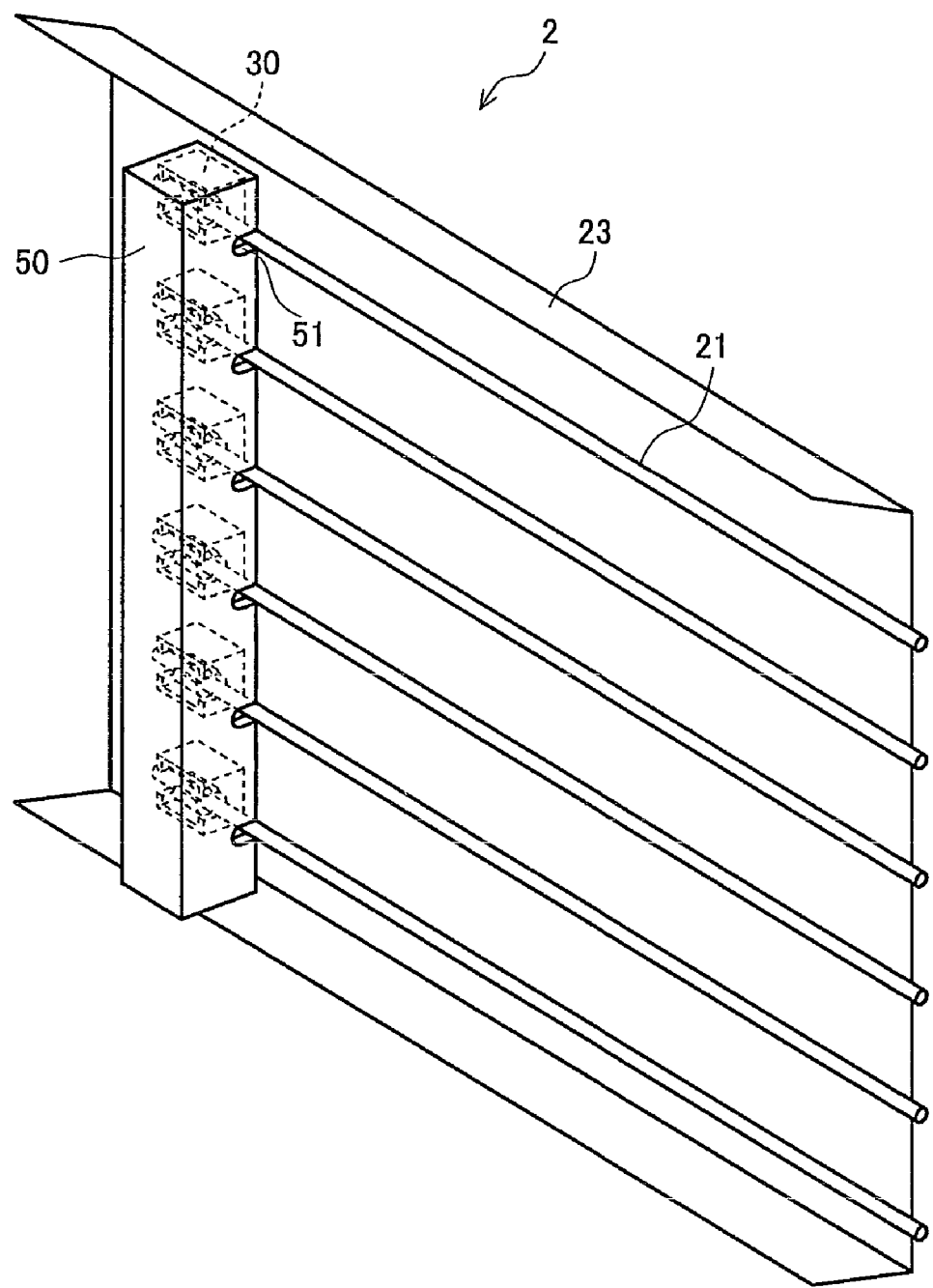
FIG. 15 is a view illustrating a step of assembling the backlight device including the connection structure of fluorescent tubes.

The inside of the backlight chassis 23, to which the lamp holder 50 is attached, is as shown in FIG. 15.

Figure 16:
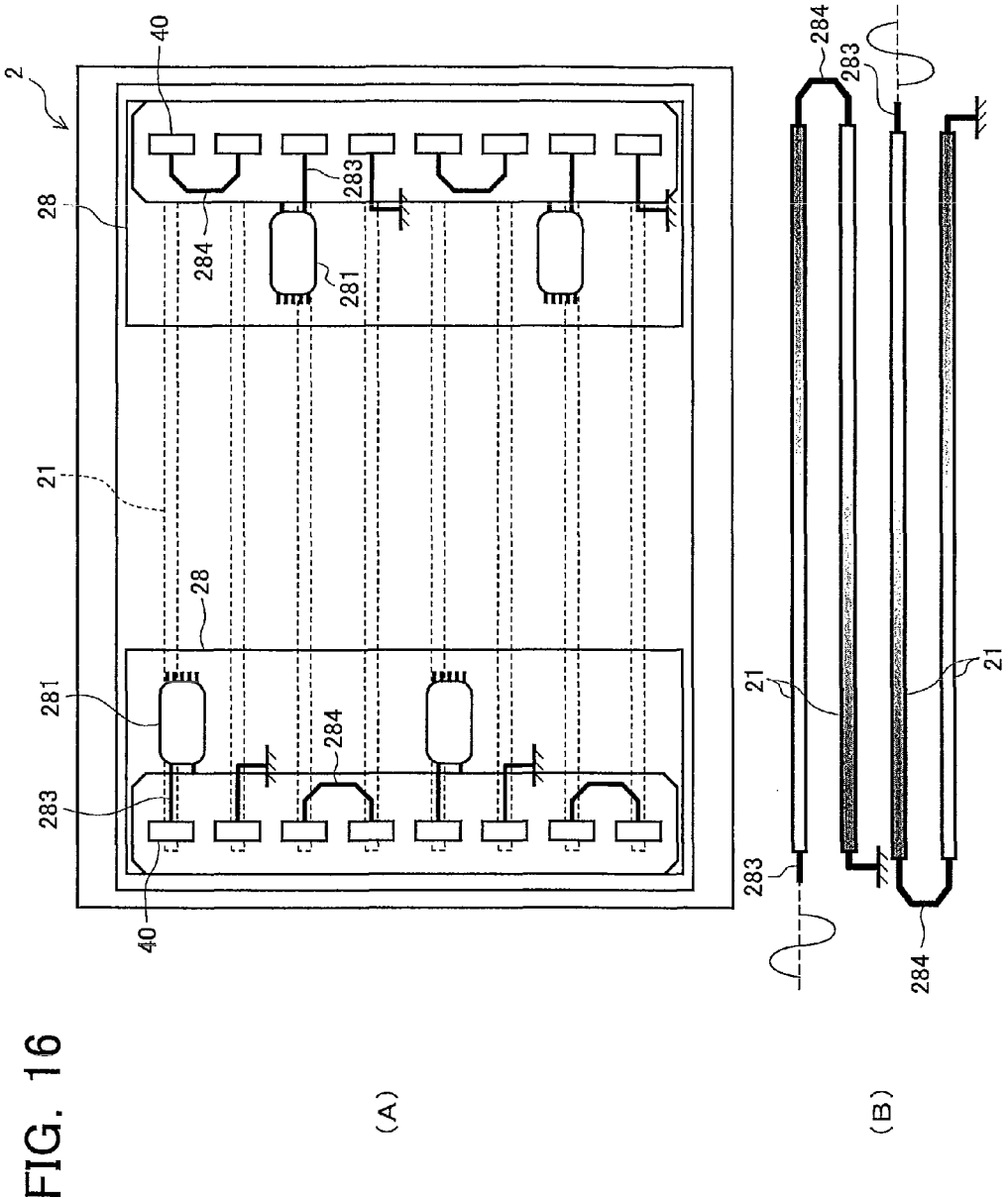
FIG. 16 is a view showing a structural example of the backlight device of the present invention.

FIG. 16 is a view showing a structural example of the backlight device of the present invention, where FIG. 16 (A) is a view schematically showing a state where the backlight chassis 23 attached with the inverter circuit boards 28 is seen from the rear face and FIG. 16 (B) is a view illustrating driving control for the fluorescent tubes at this time.

As described above, in the embodiments concerning the present invention, the fluorescent tube unit is constituted such that electrodes in one side of a pair of fluorescent tubes 21 among the plurality of fluorescent tubes 21 that are arranged in a row are connected by the conduction line 284, so that the structure substituted for the bent-tube type fluorescent tube is realized using the straight-tube type fluorescent tube.

In this example, in the fluorescent tube unit composed of a pair of fluorescent tubes 21, among electrodes not connecting the conduction line 284, the electrode of one fluorescent tube 21 is connected to the inverter transformer (one-input/one-output type) 281 and the electrode of the other fluorescent tube 21 is grounded. Thereby, the fluorescent tube units connected by the conduction line 284 are driven in a single-sided manner.

In addition, in this example, a plurality of arranged fluorescent tube units in which pairs of fluorescent tubes 21 constituting the fluorescent tube units are arranged in a state of being adjacent to each other are constituted so that the driving side (side connected to the inverter transformer) and the conduction line side (side where electrodes are connected by the conduction line 284) are arranged alternately in the arrangement direction of the fluorescent tubes 21.

This structure enables to obtain the similar effect to the case where the electrode side and the bent-portion side of the conventional bent-tube type fluorescent tube are arranged alternately. That is, the high-voltage side and the conduction line side in the fluorescent tube unit are arranged alternately, thus reducing luminance difference in the tube axis direction and making it possible to reduce or solve luminance unevenness and color unevenness of the backlight.

Moreover, it is not necessary to consider positions of electrodes like in the bent-tube type fluorescent tube when the fluorescent tubes 21 are installed in the backlight chassis 23, thus work of counting the attached number or work of holding fluorescent tubes in turn is not required, resulting in facilitation of the installation work.

In addition, also when the fluorescent tubes 21 are connected to the inverter circuit board 28, a worker may mount the fluorescent tubes 21 in the storing portions 30 after attaching the storing portions 30 to the backlight chassis 23 and connecting the inverter circuit board 28 to the storing portions 30. At this time, it is possible to prevent erroneous attaching of the fluorescent tubes 21 and breakage of the lamps, and the worker is capable of performing the installation work easily and reliably.

Moreover, in the case of the conventional bent-tube type fluorescent tube, a screen size of a liquid crystal panel is limited to a screen size in which one side has a length half the total length of the fluorescent tube at the maximum, but in the present embodiment, the straight-tube type fluorescent tube 21 is usable, thus making it also possible to cope with a large-sized screen as well.

Moreover, since the fluorescent tube unit by the conduction line is constituted using the straight-tube type fluorescent tubes, it is not necessary to enlarge an area of a frame masking a bent portion, like the bent-tube type fluorescent tube, thus making it possible to effectively utilize a screen area.

Figure 17:
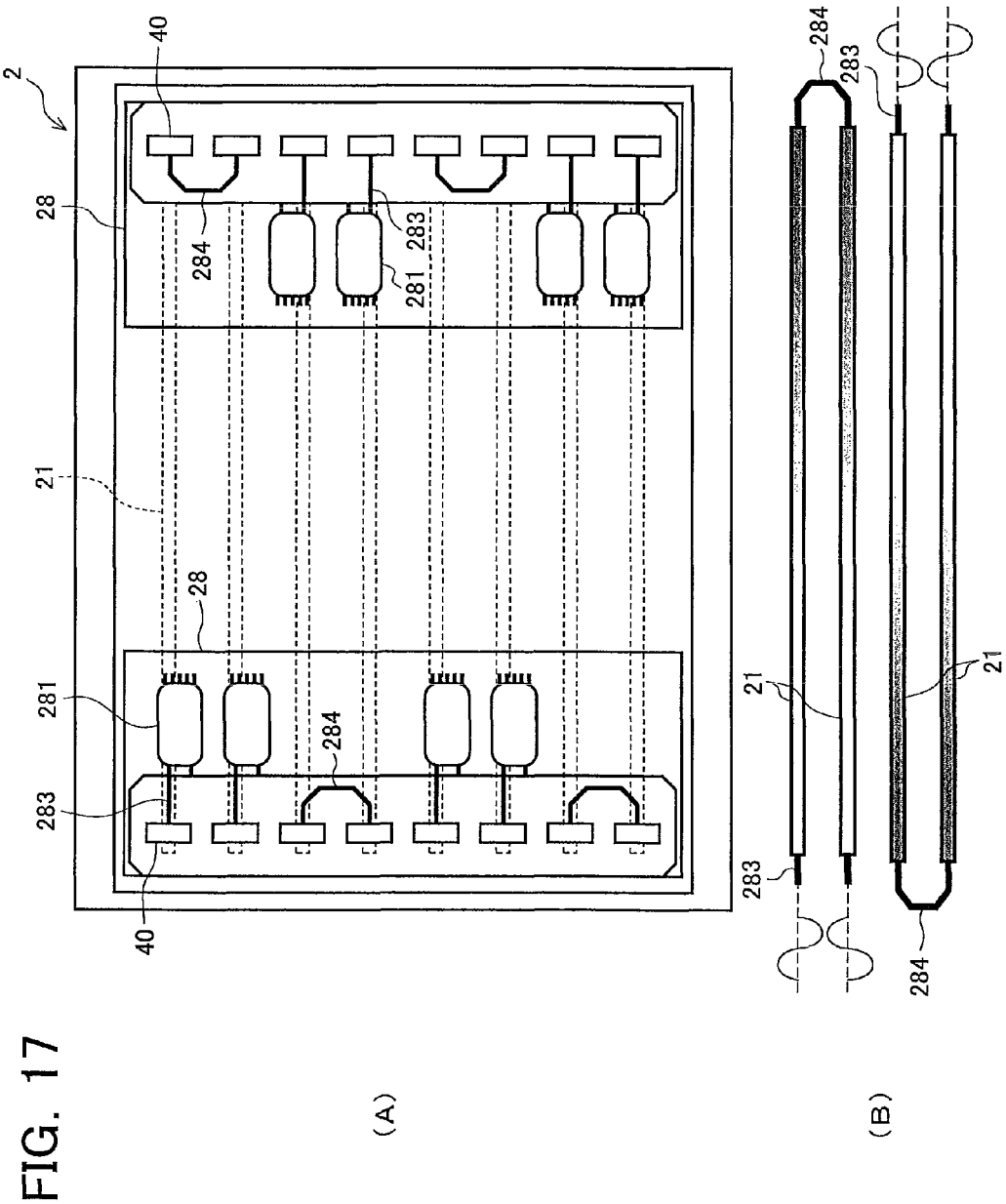
FIG. 17 is a view showing another structural example of the backlight device of the present invention.

FIG. 17 is a view showing another structural example of the backlight device of the present invention, where FIG. 17 (A) is a view schematically showing a state where the backlight chassis 23 attached with the inverter circuit boards 28 is seen from the rear face and FIG. 17 (B) is a view illustrating driving control for the fluorescent tubes at this time.

In this example, in the fluorescent tube unit composed of a pair of fluorescent tubes 21, each of the electrodes not connecting the conduction line 284 is connected to the inverter transformer (one-input/one-output type) 281 and the high-voltage alternating current voltage in which phases are reversed each other is supplied to two electrodes of the fluorescent tube unit. Thereby, the fluorescent tube units connected by the conduction line 284 are driven in an actuation (floating) method.

In addition, in this example, a plurality of arranged fluorescent tube units in which pairs of fluorescent tubes 21 constituting the fluorescent tube units are arranged in a state of being adjacent to each other are constituted so that the driving side (side connected to the inverter transformer 281) and the conduction line side (side where electrodes are connected by the conduction line 284) are arranged alternately in the arrangement direction of the fluorescent tubes 21.

This structure enables to obtain the similar effect to the case where the electrode side and the bent-portion side of the conventional bent-tube type fluorescent tube are arranged alternately. That is, the high-voltage side and the conduction line side in the fluorescent tube unit are arranged alternately, thus reducing luminance difference in the tube axis direction and making it possible to reduce or solve luminance unevenness and color unevenness of the backlight. In this example, the fluorescent tube unit is driven in a both-side driving method with an actuation method, thus making it possible to attain higher effect of solving luminance unevenness and color unevenness. Other functions and attained effect in this example are similar to the example of FIG. 16, thus repeated description thereof will be omitted.

Figure 18:
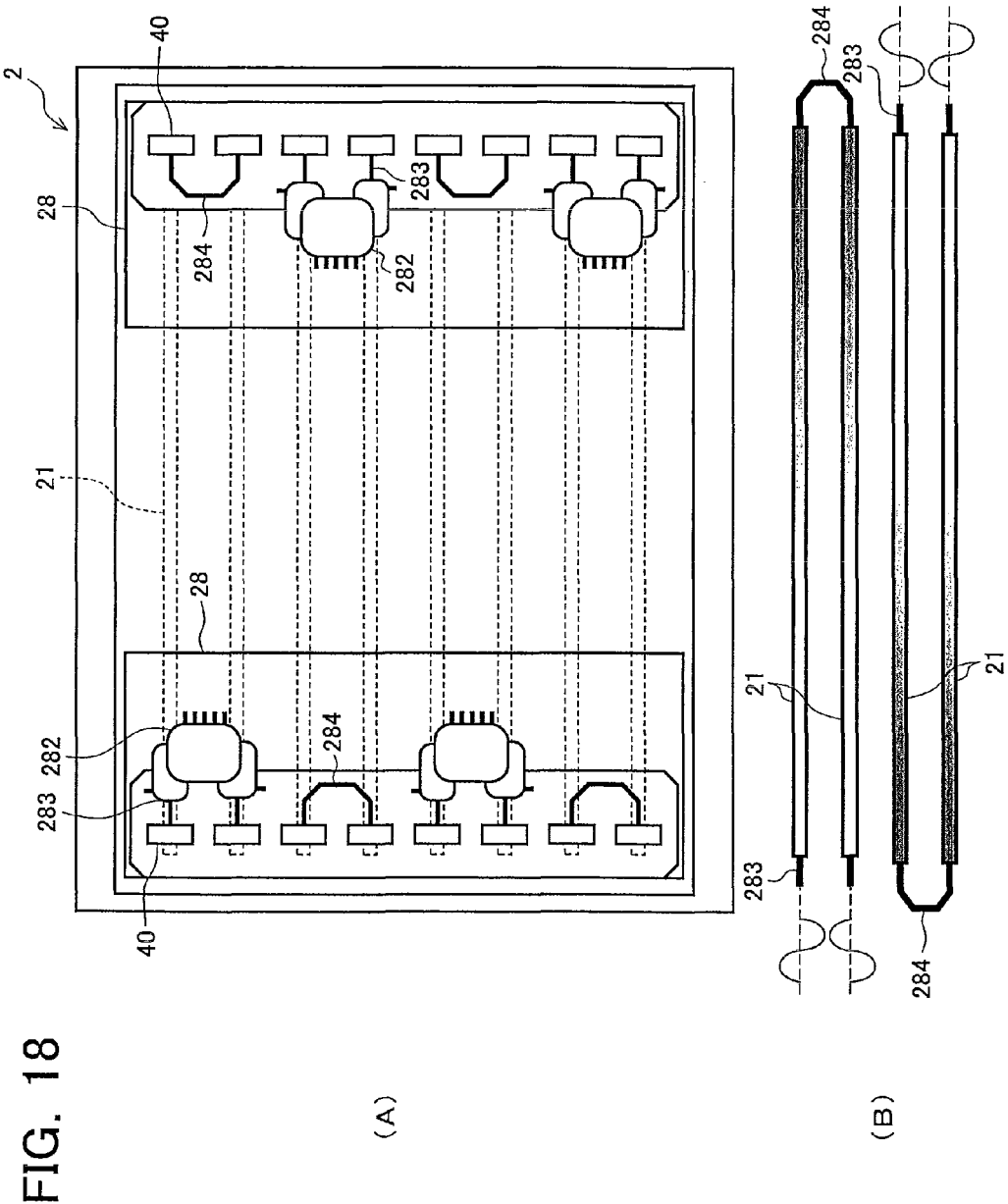
FIG. 18 is a view showing still another structural example of the backlight device of the present invention.

FIG. 18 is a view showing still another structural example of the backlight device of the present invention, where FIG. 18 (A) is a view schematically showing a state where the backlight chassis 23 attached with the inverter circuit boards 28 is seen from the rear face and FIG. 18 (B) is a view illustrating driving control for the fluorescent tubes at this time.

In this example, in the fluorescent tube unit composed of a pair of fluorescent tubes 21, the electrode not connecting the conduction line 284 is connected to a single inverter transformer (one-input/two-output type) 282 and the high-voltage alternating voltage in which phases are reversed each other is supplied to two electrodes of the fluorescent tube unit. Thereby, the fluorescent tube units connected by the conduction line 284 are driven in an actuation (floating) method.

In this example, a plurality of arranged fluorescent tube units in which pairs of fluorescent tubes 21 constituting the fluorescent tube units are arranged in a state of being adjacent to each other are constituted so that the driving side (side connected to the inverter transformer 282) and the conduction line side (side where electrodes are connected by the conduction line 284) are arranged alternately in the arrangement direction of the fluorescent tubes 21.

This structure enables to obtain the similar effect to the case where the electrode side and the bent-portion side of the conventional bent-tube type fluorescent tube are arranged alternately. That is, the high-voltage side and the conduction line side in the fluorescent tube unit are arranged alternately, thus reducing luminance difference in the tube axis direction and making it possible to reduce or solve luminance unevenness and color unevenness of the backlight. In this example, the fluorescent tube unit is driven in a both-side driving method with an actuation method, thus making it possible to attain higher effect of solving luminance unevenness and color unevenness. Other functions and attained effect in this example are similar to the example of FIG. 16, thus repeated description thereof will be omitted.

Figure 19:
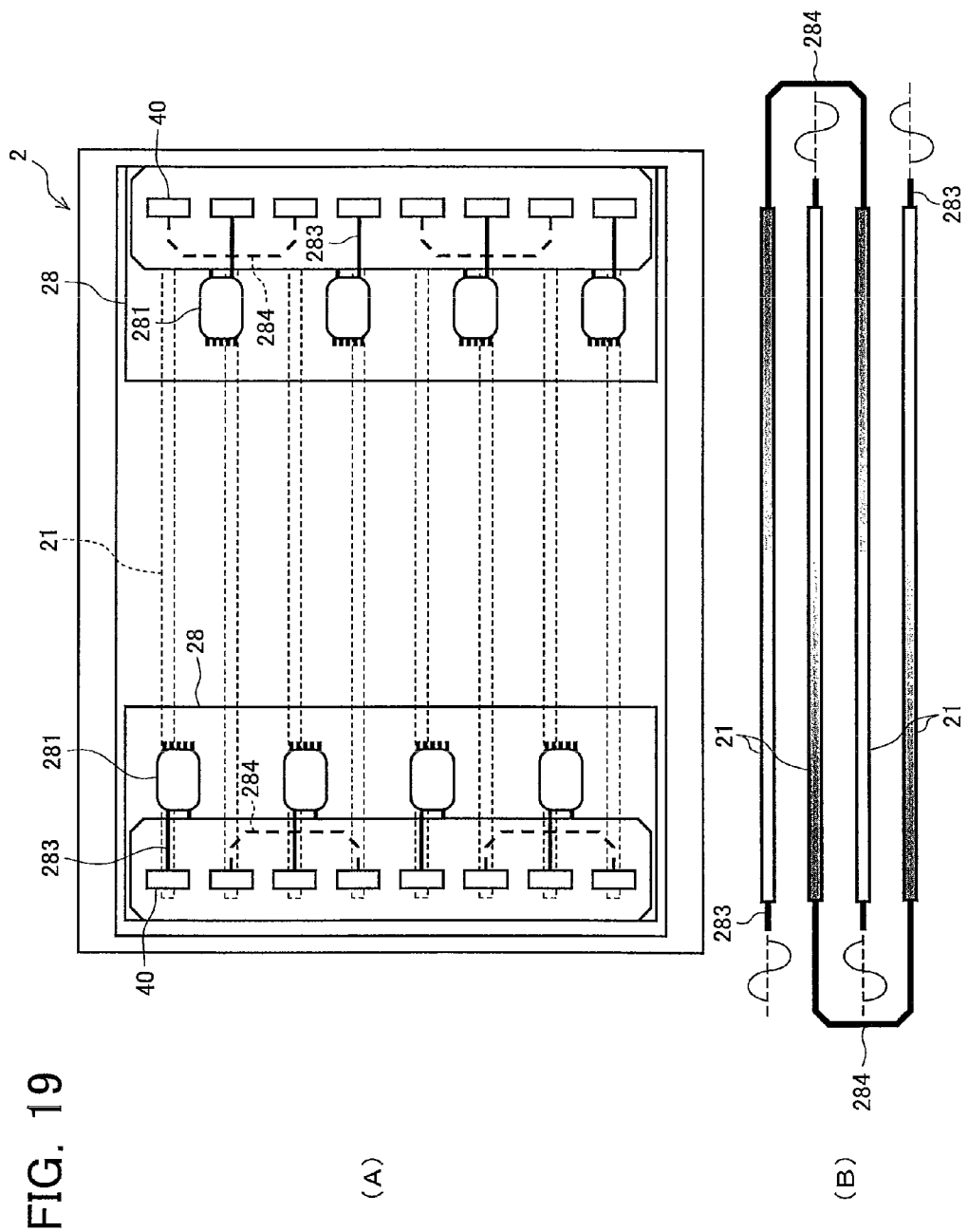
FIG. 19 is a view showing still another structural example of the backlight device of the present invention.

FIG. 19 is a view showing still another structural example of the backlight device of the present invention, where FIG. 19 (A) is a view schematically showing a state where the backlight chassis 23 attached with the inverter circuit boards 28 is seen from the rear face and FIG. 19 (B) is a view illustrating driving control for the fluorescent tubes at this time.

In this example, in the fluorescent tube unit composed of a pair of fluorescent tubes 21, each of the electrodes not connecting the conduction line 284 is connected to the inverter transformer (one-input/one-output type) 281 and the high-voltage alternating current voltage in which phases are reversed each other is supplied to two electrodes of the fluorescent tube unit. Thereby, the fluorescent tube units connected by the conduction line 284 are driven in an actuation (floating) method.

In addition, in this example, the pair of fluorescent tubes 21 constituting the fluorescent tube unit is arranged in a state where one of the fluorescent tubes 21 of another fluorescent tube unit is arranged therebetween. A plurality of fluorescent tubes 21 that are arranged are constituted so that the driving side (side connected to the inverter transformer 281) and the conduction line side (side where electrodes are connected by the conduction line 284) are arranged alternately in the arrangement direction of the fluorescent tubes 21. The conduction line 284 is formed on the rear face of the inverter transformer 281 so as not to be in contact with the high-voltage line 283 connected to adjacent fluorescent tubes 21.

This structure enables to obtain the similar effect to the case where the electrode side and the bent-portion side of the conventional bent-tube type fluorescent tube are arranged alternately. That is, the high-voltage side and the conduction line side in the fluorescent tube unit are arranged alternately, thus reducing luminance difference in the tube axis direction and making it possible to reduce or solve luminance unevenness and color unevenness of the backlight. In this example, the structure is provided, that one of the fluorescent tubes of another fluorescent tube unit is arranged between two fluorescent tubes 21 of the fluorescent tube unit, and the fluorescent tube unit is driven in a both-side driving method with an actuation method, thus making it possible to attain higher effect of solving luminance unevenness and color unevenness. Other functions and attained effect in this example are similar to FIG. 16, thus repeated description thereof will be omitted.

Figure 20:
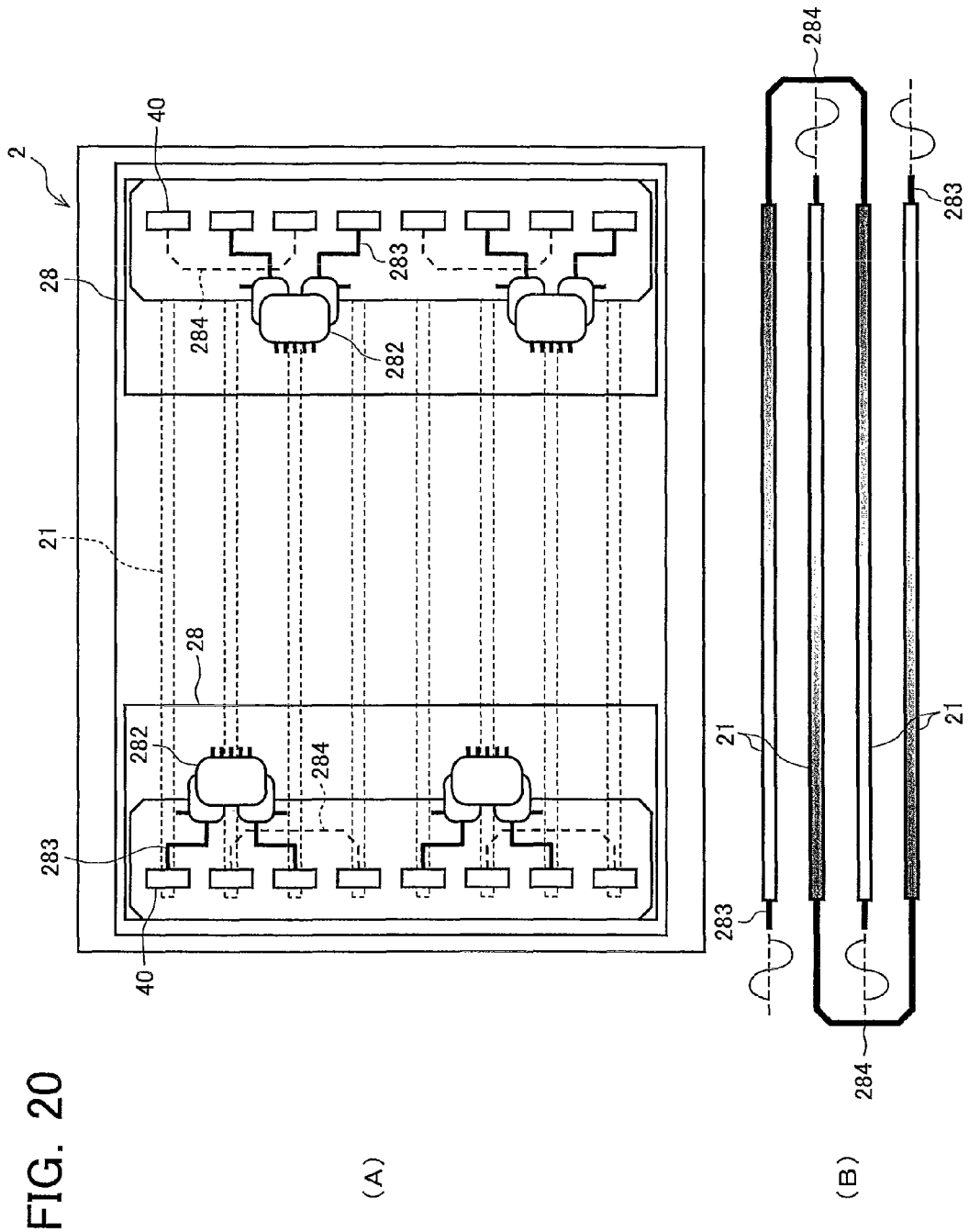
FIG. 20 is a view showing still another structural example of the backlight device of the present invention.

FIG. 20 is a view showing still another structural example of the backlight device of the present invention, where FIG. 20 (A) is a view schematically showing a state where the backlight chassis 23 attached with the inverter circuit boards 28 is seen from the rear face and FIG. 20 (B) is a view illustrating driving control for the fluorescent tubes at this time.

In this example, in the fluorescent tube unit composed of a pair of fluorescent tubes 21, the electrode not connecting the conduction line 284 is connected to a single inverter transformer (one-input/two-output type) 282 and the high-voltage alternating voltage in which phases are reversed each other is supplied to two electrodes of the fluorescent tube unit. Thereby, the fluorescent tube units connected by the conduction line 284 are driven in an actuation (floating) method.

In addition, in this example, the pair of fluorescent tubes 21 constituting the fluorescent tube unit is arranged in a state where one of the fluorescent tubes 21 of another fluorescent tube unit is arranged therebetween. A plurality of fluorescent tubes 21 that are arranged are constituted so that the driving side (side connected to the inverter transformer 282) and the conduction line side (side where electrodes are connected by the conduction line 284) are arranged alternately in the arrangement direction of the fluorescent tubes 21. The conduction line 284 is formed on the rear face of the inverter transformer 281 so as not to be in contact with the high-voltage line 283 connected to adjacent fluorescent tubes 21.

This structure enables to obtain the similar effect to the case where the electrode side and the bent-portion side of the conventional bent-tube type fluorescent tube are arranged alternately. That is, the high-voltage side and the conduction line side in the fluorescent tube unit are arranged alternately, thus reducing luminance difference in the tube axis direction and making it possible to reduce or solve luminance unevenness of the backlight. In this example, the structure is provided, that one of the fluorescent tubes of another fluorescent tube unit is arranged between two fluorescent tubes 21 of the fluorescent tube unit, and the fluorescent tube unit is driven in a both-side driving method with an actuation method, thus making it possible to attain higher effect of solving luminance unevenness and color unevenness. Other functions and attained effect in this example are similar to FIG. 16, thus repeated description thereof will be omitted.

In the above-described examples of FIGS. 19 and 20, the structure is provided, that another one fluorescent tube 21 is arranged between two fluorescent tubes 21 of the fluorescent tube unit forming a state where electrodes are conducted to each other by the conduction line 284, but the structure may be provided, that two or more other fluorescent tubes 21 are arranged between two fluorescent tubes 21 of the fluorescent tube unit. Similarly also in this case, the driving side and the conduction line side are arranged alternately side by side so that luminance unevenness and color unevenness can be solved.

Figure 21:
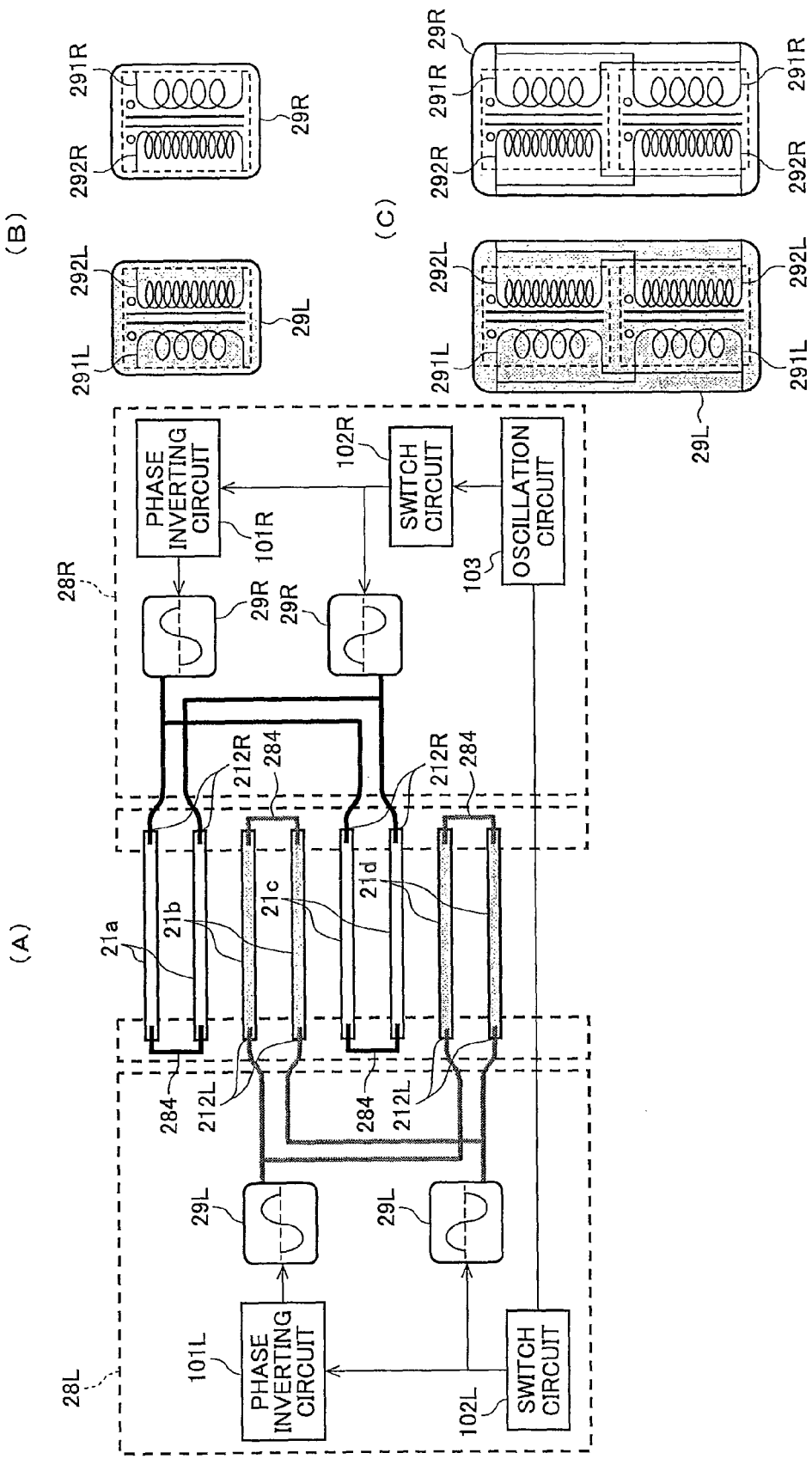
FIG. 21 is a view showing still another structural example of the backlight device of the present invention.

FIG. 21 is a view showing still another structural example of the backlight device of the present invention, where 21*a* to 21*d* denote fluorescent tube units comprised of two fluorescent tubes, 291 (291R and 291L) denote primary windings, and 292 (292R and 292L) denote secondary windings. Note that, reference numerals illustrated in the figure, R and L, indicate the right side and the left side, respectively, and the reference numerals without R and L correspond to the reference numerals of each of the above-described embodiments.

As to each of the embodiments of the present invention described above, further as shown in FIG. 21, the fluorescent tube unit 21*a* with two fluorescent tubes that are connected in series as a unit may be driven with the structure where another fluorescent tube unit (21*c*) is connected to the inverter transformer 29 in parallel. Thereby, it is possible to reduce the number of components as much as possible within a range of electric power that can be output by the inverter transformer 29.

As a specific example, connection is mainly made as follows. As shown in FIG. 21 (A), first, two inverter transformers 29R are included in one inverter circuit board 28R. A switch circuit 102R (for example, composed of two or four transistors such as an FET) is push-pull driven by an oscillation signal output from an oscillation circuit 103. Directions of currents flowing through the primary windings of each of the inverter transformers 29R are continuously changed at all times by the switch circuit 102R depending on an oscillation frequency. In this way, electric power input to the inverter transformers 29R is converted to an output voltage obtained by multiplying the set-up ratio N in accordance with winding ratios of the primary windings and the secondary windings comprised of the inverter transformers 29R by the input voltage, and the almost high-voltage alternating current voltage that causes a discharging phenomenon by fluorescent tubes is applied.

Further, a phase inverting circuit 101R is included so that the alternating current voltages output from the two inverter transformers 29R maintain a relationship of an opposite phase each other. Specifically, an embodiment is considered, that each of the inverter transformers 29R is constituted so as to have a relationship where each of the secondary windings is wound around oppositely to each of the primary windings wound around bobbins of the inverter transformers 29R, but not limited thereto, and it may be constituted so that GND terminals and high-voltage terminals in each of secondary windings of inverter transformers having the same structure are made opposite to each other and the high-voltage terminals are connected to fluorescent tubes.

In this way, high-voltage alternating current voltages having opposite phase relationships each other, that are output from the two inverter transformers 29R, are constituted so as to be supplied to each of electrodes 212R in the two other end sides of two fluorescent tube units 21*a* connected in series through the conduction line 284 and so that the fluorescent tubes connected in a U-shape are driven. At the same time, the two high-voltage alternating current voltages are constituted so as to be input similarly to other two fluorescent tube units 21*c*, resulting that, two fluorescent tube units 21*a* and 21*c* that are connected in series are connected in parallel to each other and driven with respect to the inverter transformers 29R.

Similarly, the fluorescent tube units 21*b* and 21*d* comprised of two fluorescent tubes connected in series also include two inverter transformers 29L, a switch circuit 102L, a phase inverting circuit 101L, and the like, and are subjected to parallel-connection driving with the similar structure to the case of the above fluorescent tube units 21*a* and 21*c*.

In addition, the fluorescent tube units 21a and 21c, and 21b and 21d that are driven by the inverter circuit boards 28R and 28L, respectively, are constituted so as to be arranged alternately each other, thus making it possible, even with a small number of components of transformers, to maintain a balance of luminance distribution in the right and left sides of a screen with respect to the length direction of each of the fluorescent tubes, as well as a worker is capable of assembling without being always conscious of the arrangement directions of the fluorescent tube units and the like.

Note that, although the structure of the inverter transformers have been indicated as described above, specifically, as shown in FIG. 21 (B), each of the inverter transformers is comprised of the primary windings 291R and 291L and secondary windings 292R and 292L.

Note that, in the embodiment shown in FIG. 21 (A), the inverter transformers 29 (29R and 29L) connecting each of the fluorescent tube units 21a to 21d in parallel should be comprised of as few components as possible, but when a rating (for example, output electric power and the like) of the inverter transformers 29 is short to required electric power in view of the number and length of the fluorescent tubes connected in series, each of the inverter transformers 29 are comprised of two transformers as well as the primary windings 291 (291R and 291L) thereof are connected in parallel and the secondary windings 292 (292R and 292L) thereof are connected in parallel, respectively, as shown in FIG. 21 (C), so that required electric power can be supplied by supplying electric power to each of the fluorescent tube units 21a to 21d.

Moreover, FIG. 13 illustrated as the embodiment based on the present invention shows the structural example in which the inverter circuit board 28 is arranged on the outer face of the housing 23 (that is, the face opposite to the installation face of the fluorescent tubes 21), but the inverter circuit boards 28L and 28R may be constituted so that any one of them or both of them are arranged in the inside of the housing 23. At this time, the inverter circuit boards 28 arranged in the inside of the housing are assembled so as to be stored by the lamp holder 50 as shown in FIG. 15 together with each of ends of the fluorescent tubes 21, thus, while realizing decrease in thickness of the whole of display elements, it is also possible to suppress influence on luminance unevenness that can be generated near an area where the above-described inverter circuit boards 28 are arranged. Moreover, similar effect can be exhibited also in the example where the inverter circuit boards 28 are constituted so as to be integrally provided with the lamp holder 50 for connecting the fluorescent tubes 21 in series, in the above-described description.

The invention claimed is:

1. A backlight device, comprising:
a chassis that stores, in a row, a plurality of light sources constituted by a straight-tube type external electrode fluorescent tube having electrodes at both ends;
a light source lighting circuit board that is included on a rear face of the chassis; and
a storing portion that stores a conductive holding portion, the conductive holding portion holding each external electrode, and is attached to the chassis; wherein
the storing portion is attached to the chassis so that the external electrodes form a state of being electrically connected to the light source lighting circuit board included on the rear face of the chassis,
the light source lighting circuit board comprises conduction structure of connecting electrodes in one side of two light sources of the light sources that are arranged in a row,
the conduction structure is included on a face opposite to a face where a wiring pattern for supplying electric power to the light sources from the light source lighting circuit board is included,
the conduction structure is formed in a state of passing through a lower face of electric power supplying structure that supplies electric power to the light sources, and
the conduction structure electrically connects electrodes of adjacent fluorescent tubes to each other.

2. The backlight device as defined in claim 1, wherein
a part of the storing portion passes through a through-hole provided on the chassis and forms a connection state with a connecting portion included in the light source lighting circuit hoard so that the light sources form a state of being electrically connected to the light source lighting circuit board.

3. The backlight device as defined in claim 1, wherein
a part of the storing portion is connected to a connecting portion mounted on the light source lighting circuit board so that the light sources form a state of being electrically connected to the light source lighting circuit board.

4. The backlight device as defined in claim 1, wherein
the light source lighting circuit boards are provided as a pair to be connected to both ends of the light sources that are arranged in a row.

5. The backlight device as defined in claim 1, wherein
at least one light source is arranged between two light sources forming a state where electrodes of the two light sources are in electrical contact with each other by the conduction structure.

6. The backlight device as defined in claim 1, wherein
each of the electrodes of two of the light sources connected to the conduction structure is held so as to form a channel-shaped discharge path.

7. The backlight device as defined in claim 1, wherein
two of the light sources connected to the conduction structure are supplied with electric signals with the same frequency in which phases are substantially reversed each other.

8. The backlight device as defined in claim 1, wherein
the conductive holding portion holds the electrodes so as to be attachable/detachable.

9. The backlight device as defined in claim 1, wherein
the light sources are constituted by external electrode fluorescent lamps.

10. A liquid crystal displaying device comprising the backlight device as defined in any one of claims 1 to 4 and 5 to 9 and a liquid crystal panel illuminated by the backlight device.

* * * * *